(12) United States Patent
Kasazaki et al.

(10) Patent No.: US 9,862,825 B2
(45) Date of Patent: Jan. 9, 2018

(54) THERMOPLASTIC RESIN COMPOSITION HAVING HIGH DURABILITY

(75) Inventors: Toshiaki Kasazaki, Yamatokohriyama (JP); Takahiko Yoshida, Yamatokohriyama (JP); Shoji Shimizu, Yamatokohriyama (JP); Shinsuke Uegaki, Yamatokohriyama (JP); Yoko Onishi, Yamatokohriyama (JP)

(73) Assignee: NITTA CORPORATION, Osaka-Shi, Osaka (JP)

( * ) Notice: Subject to any disclaimer, the term of this patent is extended or adjusted under 35 U.S.C. 154(b) by 0 days.

(21) Appl. No.: 14/007,931

(22) PCT Filed: Mar. 29, 2012

(86) PCT No.: PCT/JP2012/059285
§ 371 (c)(1),
(2), (4) Date: Sep. 26, 2013

(87) PCT Pub. No.: WO2012/133927
PCT Pub. Date: Oct. 4, 2012

(65) Prior Publication Data
US 2014/0017429 A1    Jan. 16, 2014

(30) Foreign Application Priority Data
Mar. 31, 2011    (JP) ................................. 2011-081232

(51) Int. Cl.
*C08L 75/06*    (2006.01)
*C08L 23/08*    (2006.01)
(Continued)

(52) U.S. Cl.
CPC .............. *C08L 75/06* (2013.01); *B65G 15/32* (2013.01); *C08L 23/0869* (2013.01);
(Continued)

(58) Field of Classification Search
CPC .......... C08L 75/00; C08L 75/06; C08L 75/08; C08L 75/10; C08L 2205/18
(Continued)

(56) References Cited

U.S. PATENT DOCUMENTS 4,500,671 A  *  2/1985  Goyert .................... C08K 7/02
                                                    524/494
4,943,603 A  *  7/1990  Martinez ..................... 523/220
(Continued)

FOREIGN PATENT DOCUMENTS

DE         198 26 343 A1    12/1999
DE    10 2006 014 985 A1    10/2007
(Continued)

OTHER PUBLICATIONS

Advanced Polymer Technologies. Evidentiary reference. Available at http://aptllc.net/assets/pdf/Nylon-66-Datasheet.pdf.*
(Continued)

*Primary Examiner* — Mike M Dollinger
(74) *Attorney, Agent, or Firm* — Birch, Stewart, Kolasch & Birch, LLP

(57) ABSTRACT

The thermoplastic resin composition according to the present invention includes a thermoplastic resin (A), and a modified ethylene copolymer (B) dispersed and contained therein, wherein the modified ethylene copolymer (B) in the thermoplastic resin composition has an average dispersed particle aspect ratio of 1 to 3.5, and an average dispersed particle diameter of not more than 3 μm. The modified ethylene copolymer (B) is preferably a copolymer, modified with an unsaturated carboxylic acid or a derivative thereof, of ethylene with at least one monomer component selected from the group consisting of (i) olefin components except for ethylene, (ii) diene components and (iii) ester components having an ethylenically unsaturated group.

5 Claims, 7 Drawing Sheets

(51) Int. Cl.
| | |
|---|---|
| C08L 75/04 | (2006.01) |
| C08L 23/26 | (2006.01) |
| C08L 75/12 | (2006.01) |
| B65G 15/32 | (2006.01) |
| F16G 1/14 | (2006.01) |
| C08L 67/02 | (2006.01) |
| C08L 77/06 | (2006.01) |
| C08L 77/12 | (2006.01) |
| C08L 23/16 | (2006.01) |
| C08G 69/40 | (2006.01) |
| C08G 69/44 | (2006.01) |
| C08L 77/02 | (2006.01) |
| C08L 53/02 | (2006.01) |

(52) U.S. Cl.
CPC .............. *C08L 23/26* (2013.01); *C08L 67/02* (2013.01); *C08L 67/025* (2013.01); *C08L 75/04* (2013.01); *C08L 75/12* (2013.01); *C08L 77/06* (2013.01); *C08L 77/12* (2013.01); *F16G 1/14* (2013.01); *C08G 69/40* (2013.01); *C08G 69/44* (2013.01); *C08L 23/16* (2013.01); *C08L 53/025* (2013.01); *C08L 77/02* (2013.01); *C08L 2207/04* (2013.01); *Y10T 428/1372* (2015.01)

(58) Field of Classification Search
USPC ....................................................... 428/36.4
See application file for complete search history.

(56) References Cited

U.S. PATENT DOCUMENTS

| | | | | |
|---|---|---|---|---|
| 4,975,207 | A | * | 12/1990 | Lee ............................... 524/494 |
| 5,149,739 | A | | 9/1992 | Lee |
| 5,274,023 | A | * | 12/1993 | Takahashi et al. ........... 524/425 |
| 5,594,062 | A | * | 1/1997 | Takemura ................. C08F 8/30 524/504 |
| 6,319,985 | B1 | | 11/2001 | Bruning et al. |
| 6,559,229 | B1 | | 5/2003 | Bruning et al. |
| 2003/0162040 | A1 | | 8/2003 | Matsumoto et al. |
| 2004/0242737 | A1 | * | 12/2004 | Topulos ........................ 524/115 |
| 2011/0028651 | A1 | | 2/2011 | Kawaguchi et al. |

FOREIGN PATENT DOCUMENTS

| | | |
|---|---|---|
| JP | 6-234897 A | 8/1994 |
| JP | H08-157664 A | 6/1996 |
| JP | 11-349804 A | 12/1999 |
| JP | 2001-247760 A | 9/2001 |
| JP | 2002-275360 A | 9/2002 |
| JP | 2007-254567 A | 10/2007 |
| JP | 2008-239842 A | 10/2008 |
| JP | 2008-260887 A | 10/2008 |
| JP | 2009-144058 A | 7/2009 |
| JP | 2011-52210 A | 3/2011 |

OTHER PUBLICATIONS

Plastics International. Evidentiary reference. Available at http://www.plasticsintl.com/polyhardness.htm.*
Machine Translation of JP 06-234897.*
International Search Report issued in PCT/JP2012/059285, dated May 29, 2012.
Database WPI, Thompson Scientific, AN: 2009-K96390, AP: JP20070323027, XP-002732647, Week 200946, 3 pages.
Extended European Search Report, issued Nov. 26, 2014, for European Application No. 12764120.7.
Chinese Office Action issued in counterpart Chinese Patent Application No. 201280015846.1, dated Feb. 2, 2015.
Jian Huang et al.; Toughness Effect of High Temperature Grafting of EPDM with Maleic Anhydride on Nylon 66; China Plastics Industry; vol. 28, Issue 5, pp. 13, 14 and 27.
English language translation of Golf Ball Hardness Comparison Guide, Japan Patent Office, Ministry of Economy, Trade and Industry, p. 147, accessed Oct. 8, 2015.
Japanese Notice of Reasons for Rejections Dated Aug. 4, 2015 for Application No. 2013-507850 with English language translation.

* cited by examiner

[FIG. 1]
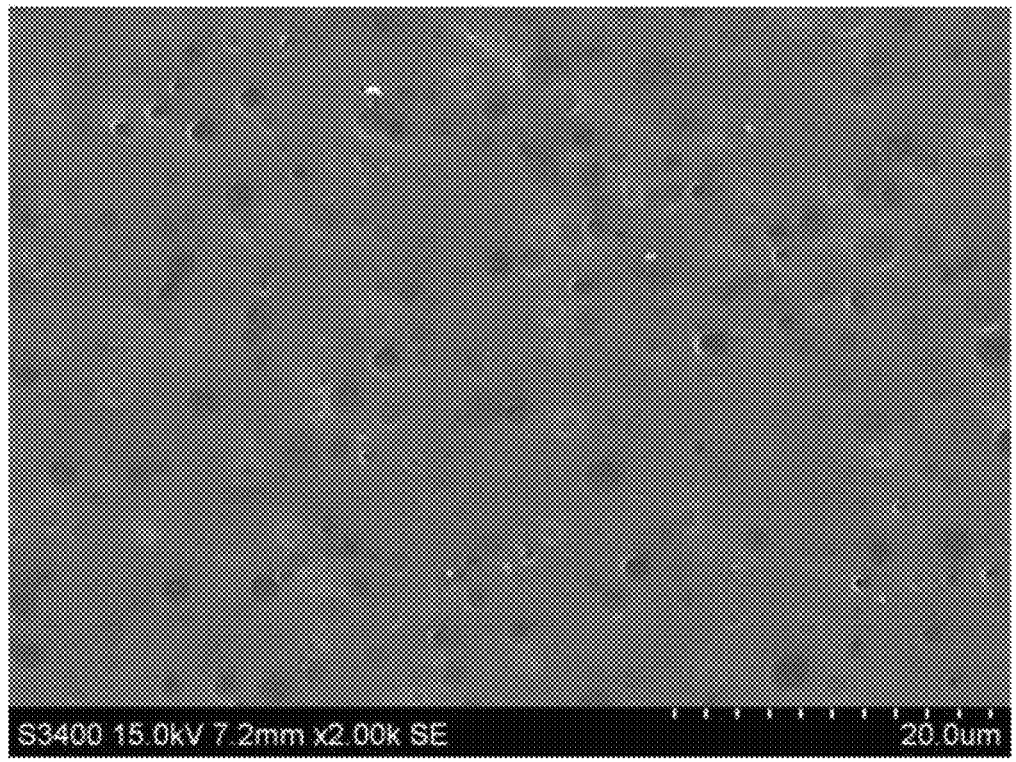
[FIG.2]
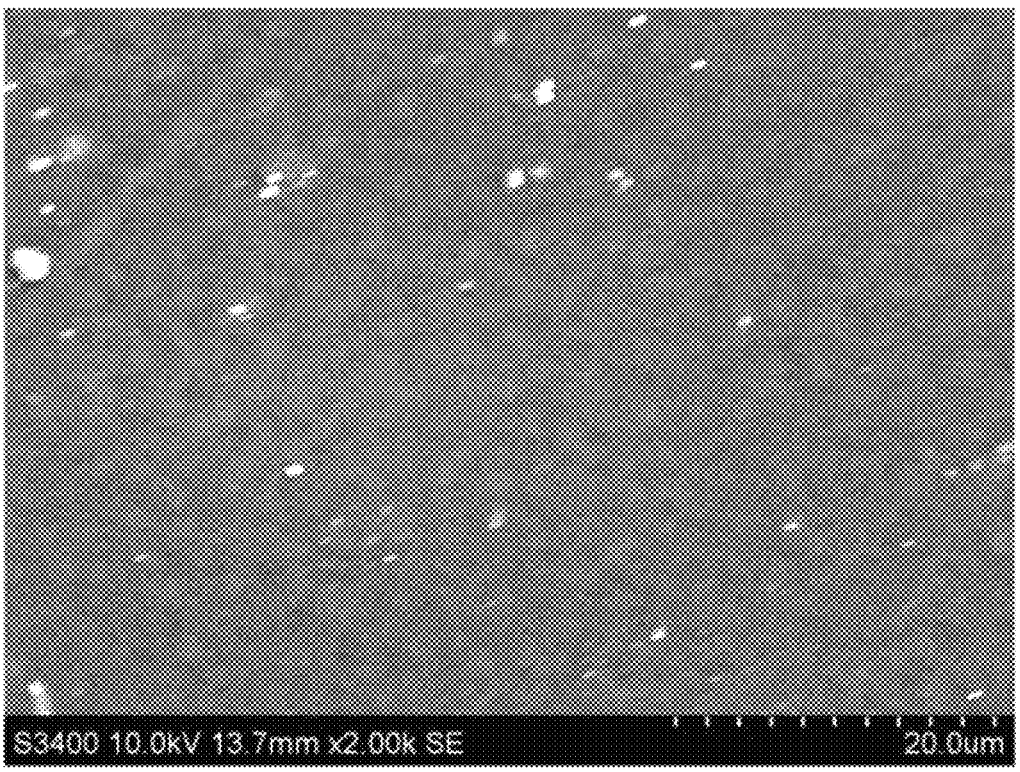

[FIG.3]
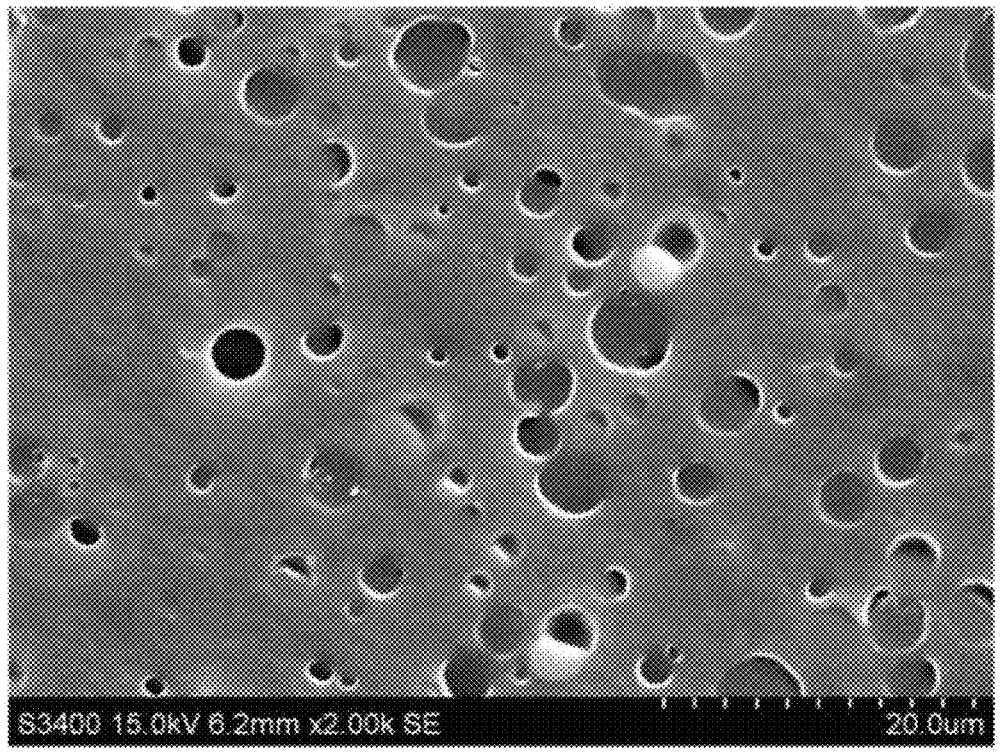
[FIG.4]
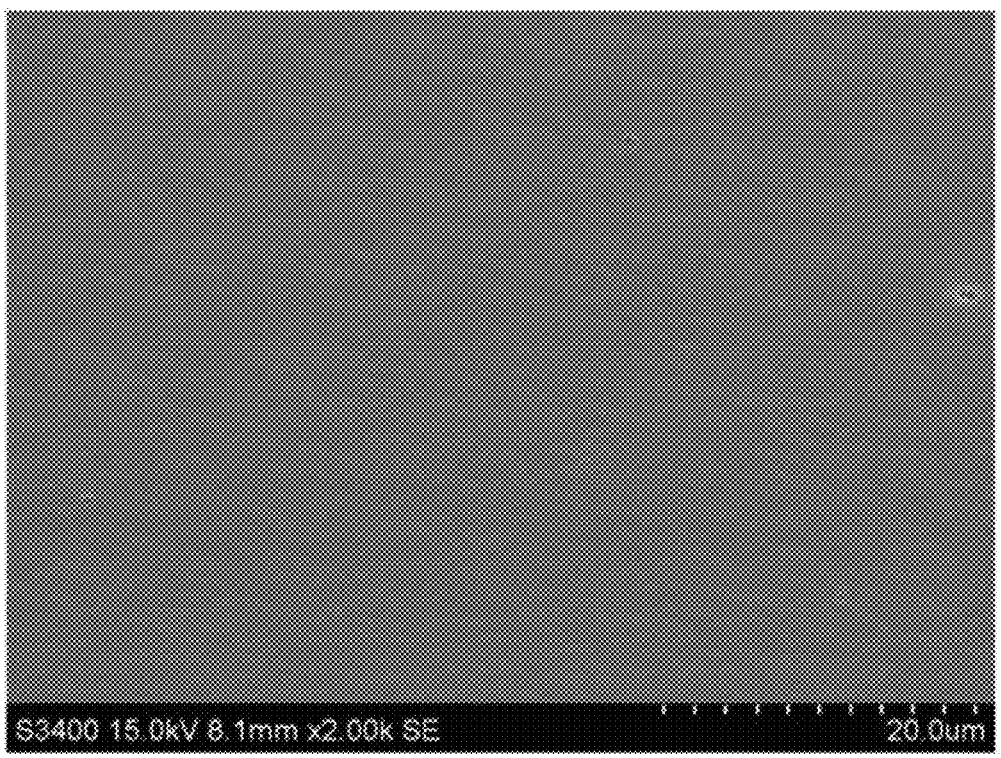

[FIG.5]
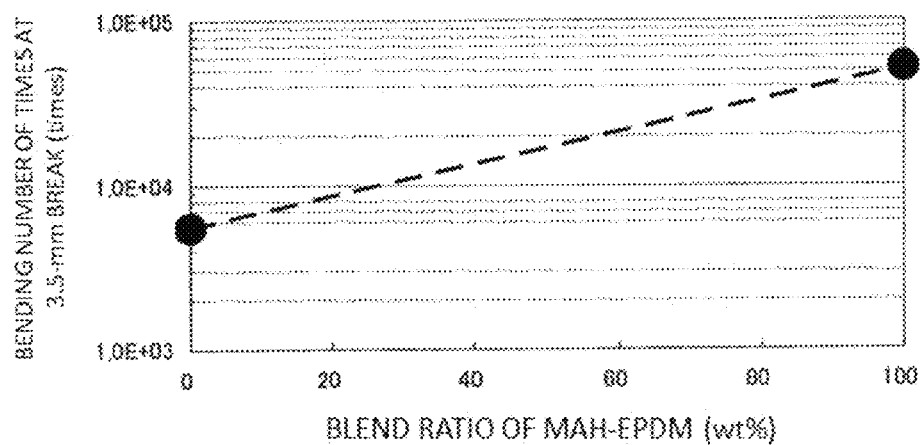
(a)
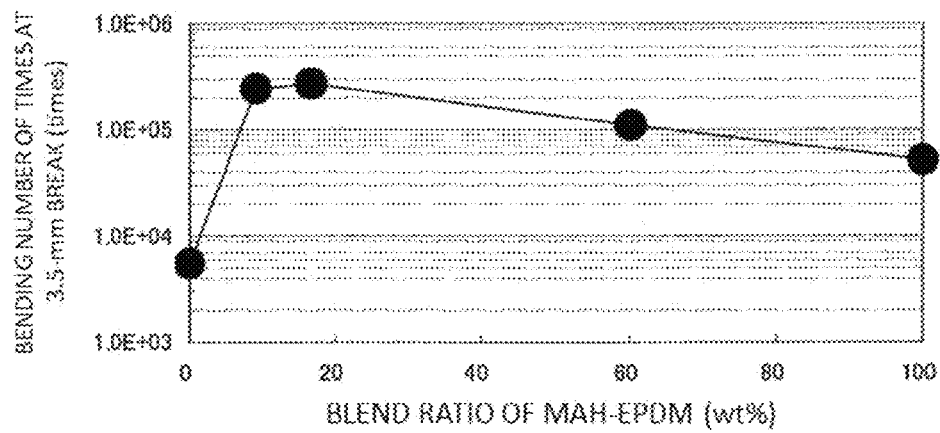
(b)
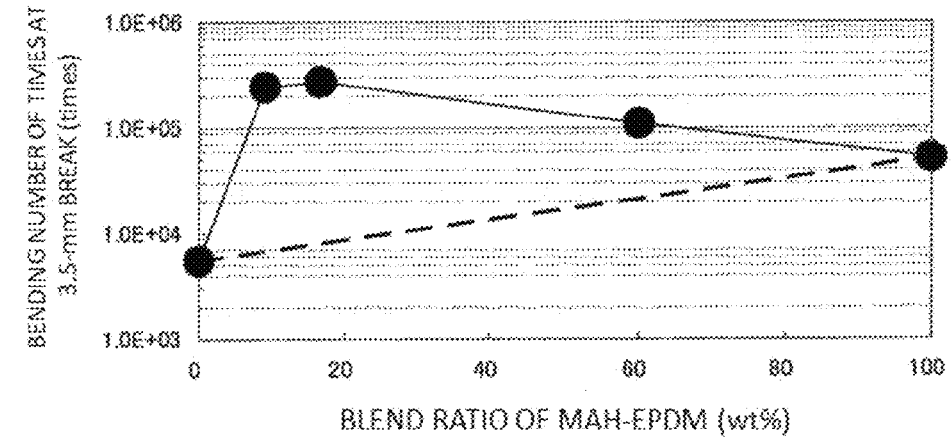
(c)

[FIG.6]
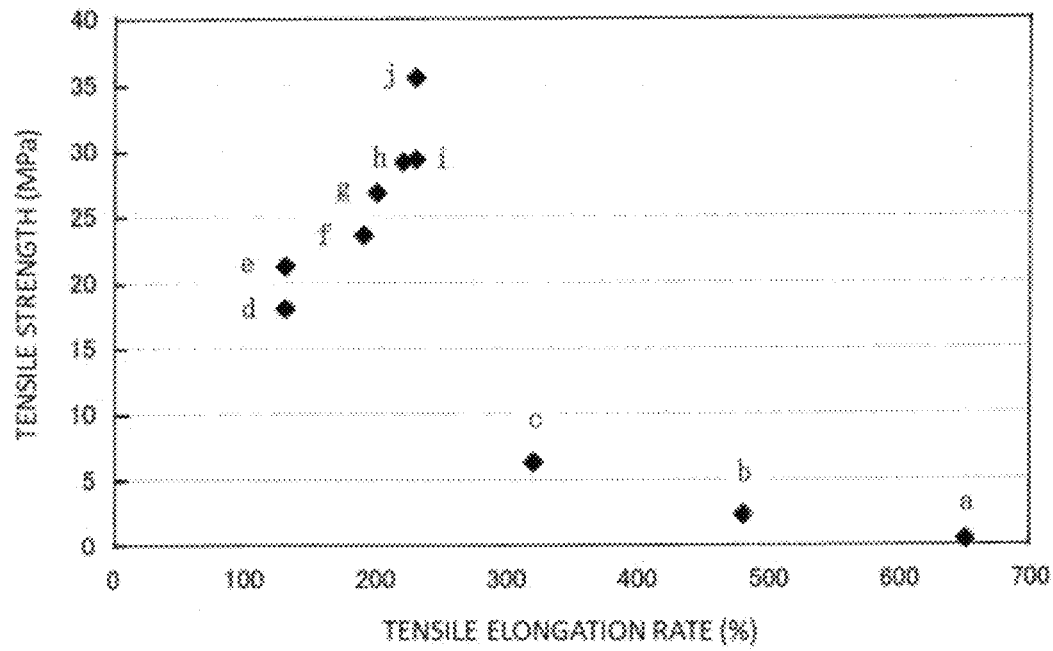
[FIG.7]
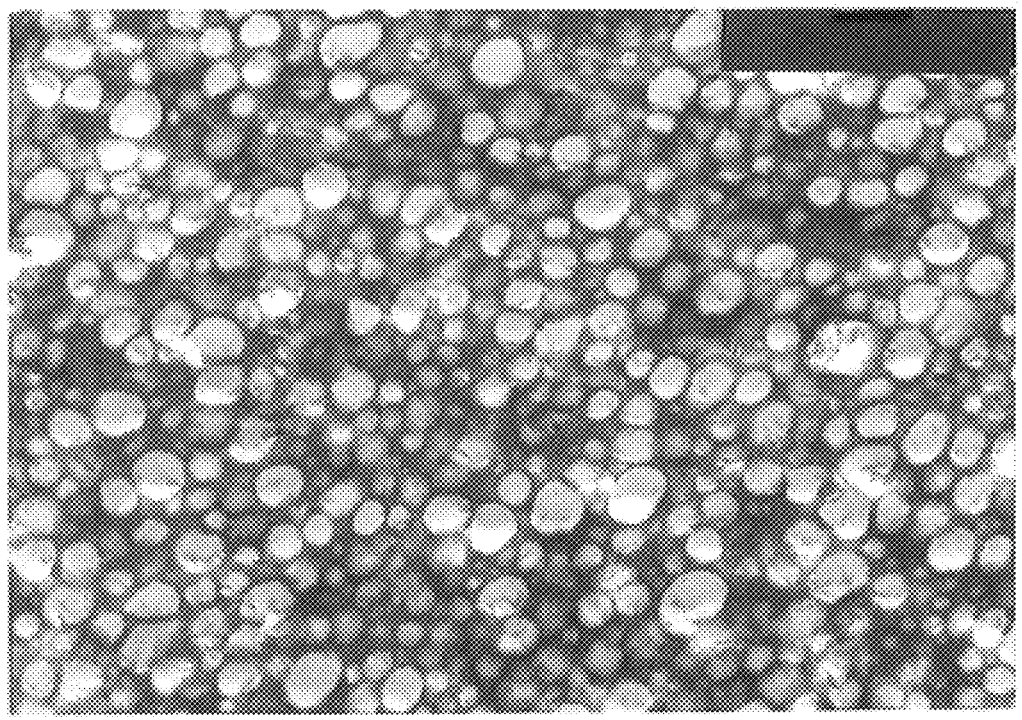

[FIG.8]
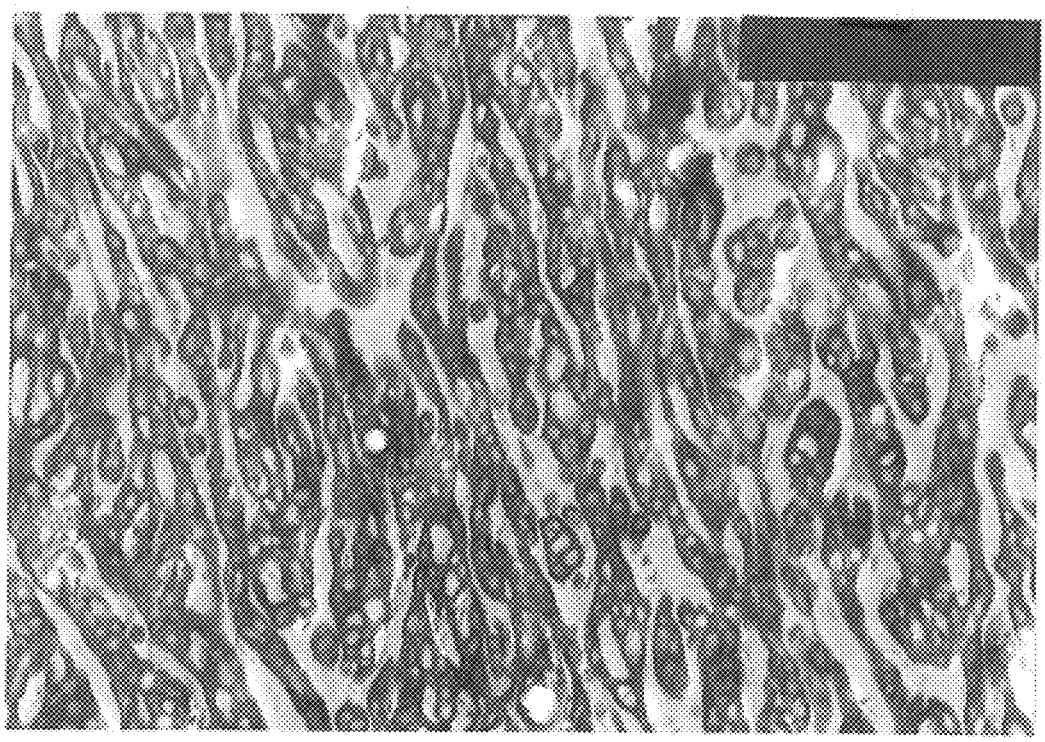
[FIG.9]
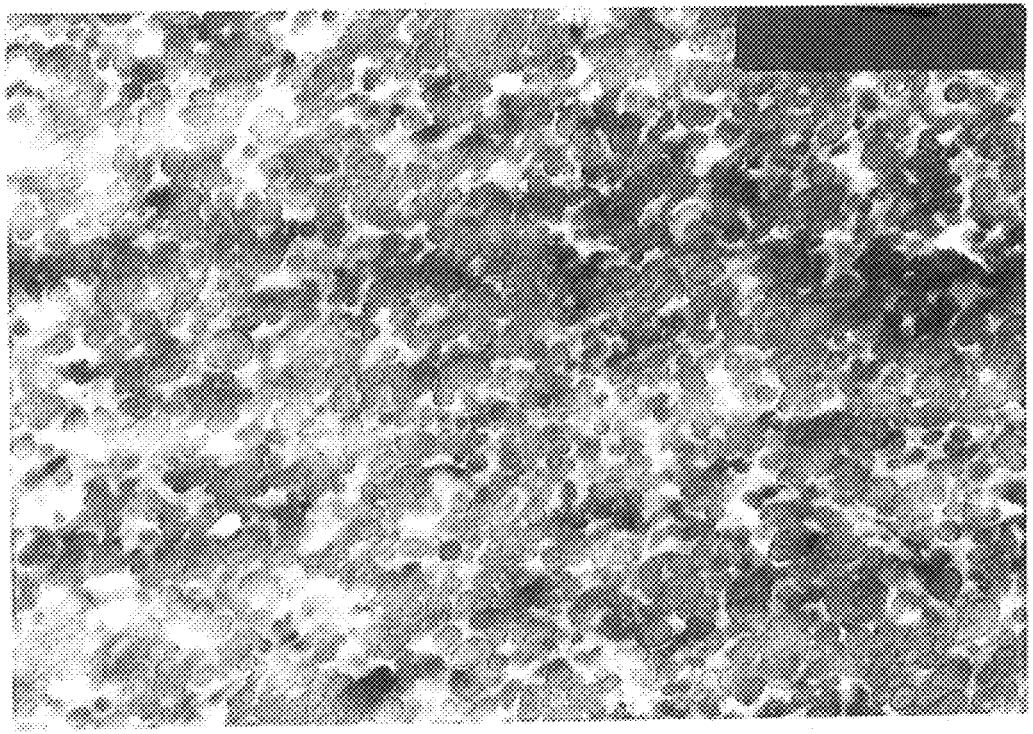

[FIG.10]
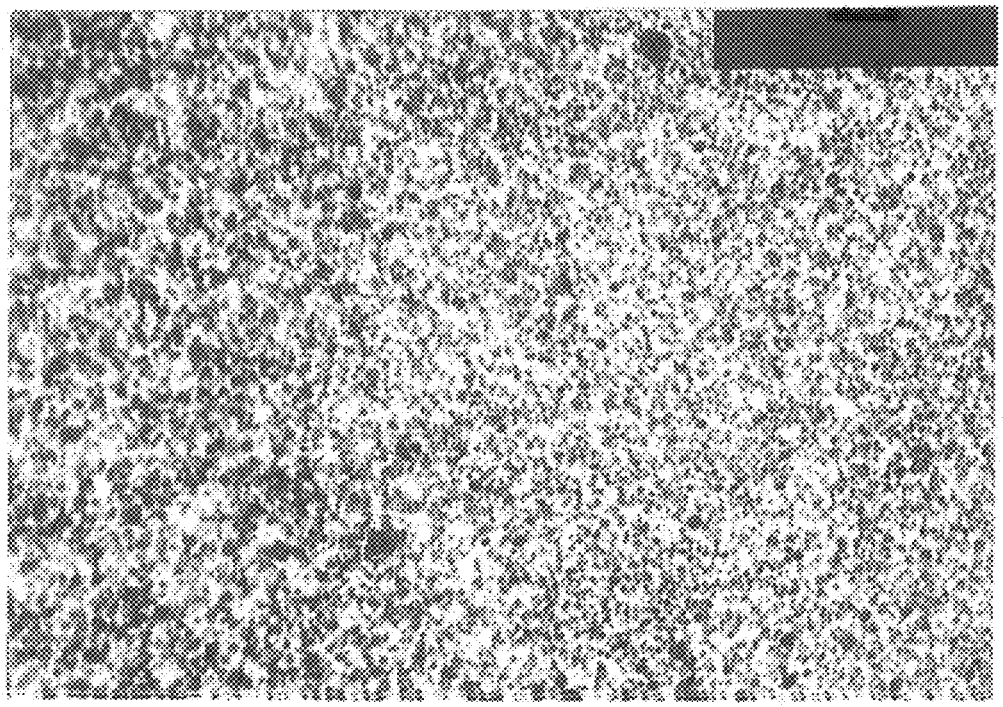
[FIG.11]
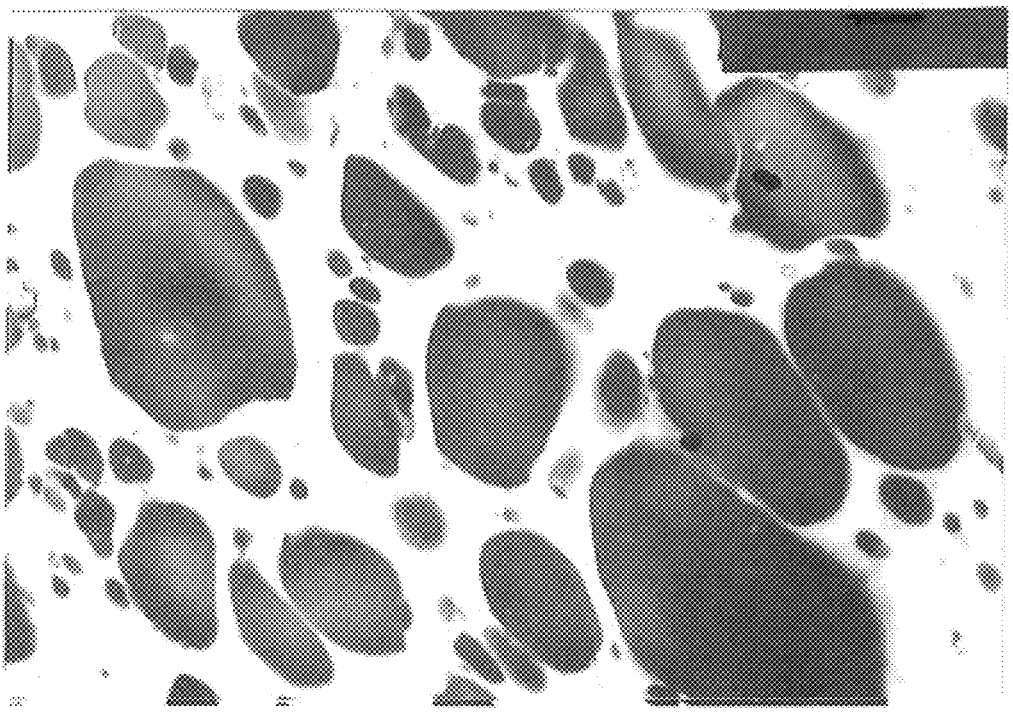

[FIG.12]
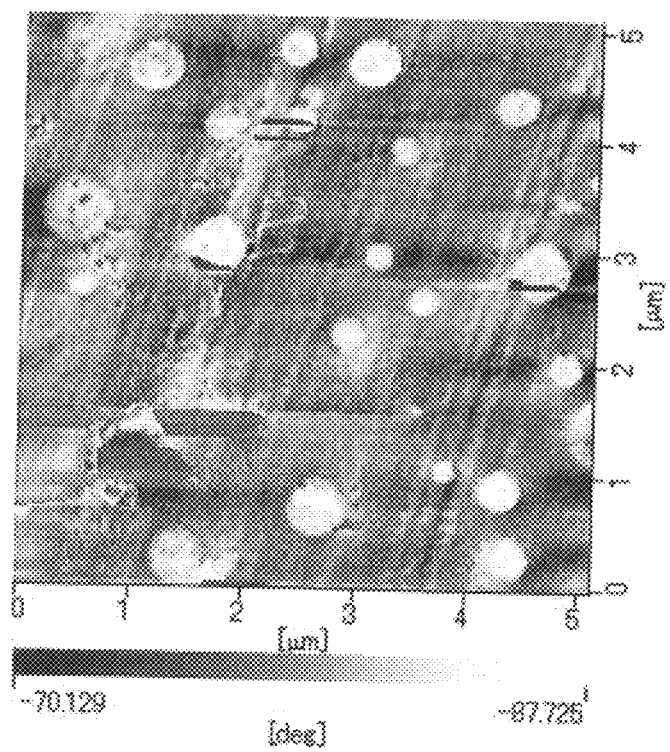
[FIG.13]
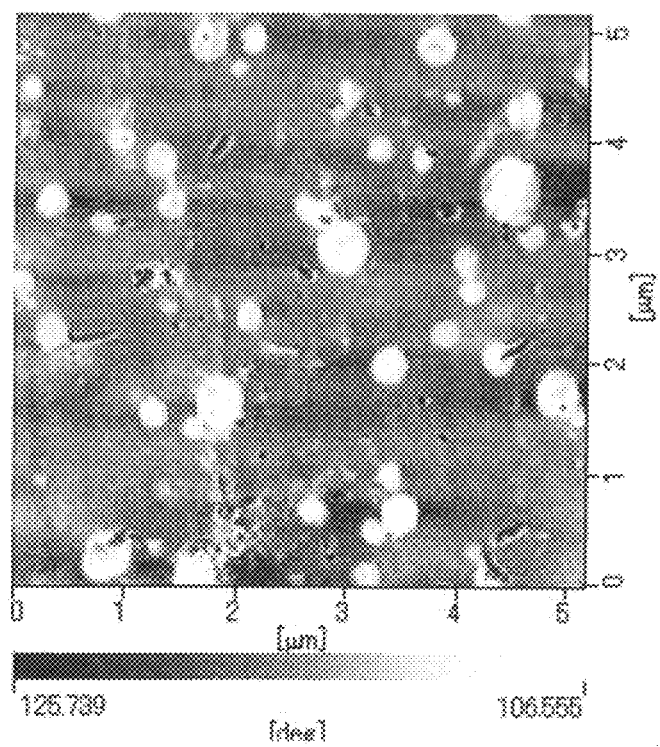

THERMOPLASTIC RESIN COMPOSITION HAVING HIGH DURABILITY

TECHNICAL FIELD

The present invention relates to a thermoplastic resin composition, particularly to a thermoplastic resin composition having durability, particularly, high bending fatigue resistance, and a molded article formed from the thermoplastic resin composition.

BACKGROUND ART

Thermoplastic polyurethanes (TPU) as urethanic thermoplastic elastomers (TPE), since having good elasticity and being excellent in abrasion resistance, mechanical strength, chemical resistance and the like, are used as materials of belt products, tubes, hoses and other various types of molded articles.

However, molded articles formed from thermoplastic polyurethanes, if used for a long time in the state of being continuously or intermittently subjected to a large load, come to be damaged and broken in some cases. For example, if belt products formed from thermoplastic polyurethanes are used for a long time, belt members and the like abrade and crack in some cases.

Japanese Patent Laid-Open No. 11-349804 discloses a blend containing a thermoplastic polyurethane and an ethylene-propylene rubber (EPM) and/or a modified ethylene-propylene rubber (modified EPM) in a proportion of the former/the latter (in weight ratio)=3/1 to 999/1. However, molded articles using the blend, if used for a long time under a heavy load state, cannot always be said to have sufficient durability, particularly, sufficient bending fatigue resistance.

CITATION LIST

Patent Literature

Patent Literature 1: Japanese Patent Laid-Open No. 11-349804

SUMMARY OF INVENTION

Technical Problem

Therefore, it is an object of the present invention to provide a thermoplastic resin composition capable of providing a thermoplastic resin molded article not causing abrasion, damage, cracks, breaks and the like and being remarkably excellent in durability even if the molded article is used for a long time in the state of being subjected to a large load or even if the time of being subjected to a load is short, and a molded article formed from the thermoplastic resin composition.

It is another object of the present invention particularly to provide a thermoplastic resin composition useful as a material for a belt product and the like having remarkably high durability usable without damage for a long time, and a molded article formed from the thermoplastic resin composition.

Solution to Problem

As a result of detailed studies on the relationship between the bending fatigue resistance and the shape and diameter of a dispersed particle into a thermoplastic resin composition comprising a thermoplastic resin and a modified ethylene copolymer, and obtained by dispersing the modified ethylene copolymer (B) into the thermoplastic resin (A) in order to achieve the above objects, the present inventors have found that the regulation of the average dispersed particle aspect ratio and the average dispersed particle diameter in specific ranges remarkably improves the durability (particularly, bending fatigue resistance) of a molded article formed from the thermoplastic resin composition. It also has been found that the blending of a polyurethane-based thermoplastic elastomer (thermoplastic polyurethane) with a modified ethylene-propylene-diene copolymerized rubber (modified EPDM), which has often been utilized as industrial crosslinked rubber products, and has not been used as a modifier for other resins so far, can provide a molded article remarkably improved in not only the abrasion resistance but also the bending fatigue resistance, and thus remarkably excellent in durability. These findings have led to the completion of the present invention by carrying out further studies.

That is, the present invention provides a thermoplastic resin composition comprising a thermoplastic resin (A) and a modified ethylene copolymer (B) dispersed in the thermoplastic resin (A), and obtained by dispersing the modified ethylene copolymer (B) into the thermoplastic resin (A), wherein the modified ethylene copolymer (B) in the thermoplastic resin composition has an average dispersed particle aspect ratio of 1 to 3.5, and an average dispersed particle diameter of not more than 3 μm.

The modified ethylene copolymer (B) is preferably a copolymer, modified with an unsaturated carboxylic acid or a derivative thereof, of ethylene with at least one monomer component selected from the group consisting of (i) olefin components except for ethylene, (ii) diene components and (iii) ester components having an ethylenically unsaturated group.

The thermoplastic resin (A) is preferably at least one selected from the group consisting of polyamide resins, polyester resins, polycarbonate-based resins and polyacetal resins.

The thermoplastic resin (A) is preferably a thermoplastic elastomer (TPE) (A1) as well. The thermoplastic elastomer (A1) is preferably at least one selected from the group consisting of polyurethane-based thermoplastic elastomers (A11), polyester-based thermoplastic elastomers (A12) and polyamide-based thermoplastic elastomers (A13).

The weight proportion [(B)/(A)] of the modified ethylene copolymer (B) to the thermoplastic resin (A) is, for example, in the range of 0.1/99.9 to 60/40.

The present invention also provide a thermoplastic resin composition being a thermoplastic elastomer alloy comprising a polyurethane-based thermoplastic elastomer (A11) and a modified ethylene-propylene-diene copolymerized rubber (B1), and obtained by dispersing the modified ethylene-propylene-diene copolymerized rubber (B1) into the polyurethane-based thermoplastic elastomer (A11).

The weight proportion [(B1)/(A11)] of the modified ethylene-propylene-diene copolymerized rubber (B1) to the polyurethane-based thermoplastic elastomer (A11) is, for example, in the range of 0.1/99.9 to 60/40. The modified ethylene-propylene-diene copolymerized rubber (B1) is preferably an ethylene-propylene-diene copolymerized rubber modified with an unsaturated carboxylic acid or a derivative thereof. The modified ethylene-propylene-diene copolymerized rubber (B1) in the thermoplastic elastomer alloy preferably has an average dispersed particle aspect ratio of 1 to 3.5 and an average dispersed particle diameter of not more than 3 μm.

The each thermoplastic resin composition preferably has a hardness (JIS K6253, durometer type A) of not less than 60.

The present invention further provides a molded article (excluding belts) formed from the each thermoplastic resin composition.

The molded article includes tubes, hoses, adsorption pads, vibration-proof dampers, vibration-proof joints, shock absorbers, casters, rollers and packings.

In the present description, the hardness is a value measured according to JIS K6253 (durometer type A). However, in Examples, there were cases where measurement was carried out using durometer type D (which will be described to the effect).

Advantageous Effects of Invention

The thermoplastic resin composition according to the present invention can provide a thermoplastic resin molded article which is not only excellent in the abrasion resistance but also remarkably excellent in the durability (particularly, bending fatigue resistance), hardly causes abrasion, damage, cracks, breaks and the like even if the molded article is used for a long time in the state of being impressed with a large load or even if the time of being subjected to a load is short, and is remarkably excellent in the durability and has a long life in the case where the thermoplastic resin composition is deformed and even in the case where the thermoplastic resin composition is used in the vicinity of another deforming material and is directly or indirectly subjected to an impact and an influence thereof.

BRIEF DESCRIPTION OF DRAWINGS

FIG. 1 is a SEM photograph of a pellet cross-section of a thermoplastic elastomer alloy (an alloy of an EPDM and an etheric TPU) obtained in Comparative Example 4.

FIG. 2 is a SEM photograph of a pellet cross-section of a thermoplastic elastomer alloy (an alloy of a maleic anhydride-modified EPDM and an etheric TPU) obtained in Example 4.

FIG. 3 is a SEM photograph of a pellet cross-section of a thermoplastic elastomer alloy (an alloy of an EPDM and an esteric TPU) obtained in Comparative Example 6.

FIG. 4 is a SEM photograph of a pellet cross-section of a thermoplastic elastomer alloy (an alloy of a maleic anhydride-modified EPDM and an esteric TPU) obtained in Example 7.

FIG. 5 is a graph indicating a relationship between the blend ratio of a modified ethylene copolymer in a thermoplastic resin composition and the bending fatigue resistance.

FIG. 6 is a graph indicating results of tensile tests of resin compositions obtained in Examples 14 to 18 and Comparative Examples 11 to 15.

FIG. 7 is a TEM photograph of a sheet cross-section of a resin composition obtained in Comparative Example 11.

FIG. 8 is a TEM photograph of a sheet cross-section of a resin composition obtained in Comparative Example 14.

FIG. 9 is a TEM photograph of a sheet cross-section of a resin composition obtained in Example 14.

FIG. 10 is a TEM photograph of a sheet cross-section of a resin composition obtained in Example 19.

FIG. 11 is a TEM photograph of a sheet cross-section of a resin composition obtained in Comparative Example 16.

FIG. 12 is an AFM photograph of a pellet cross-section of a thermoplastic elastomer alloy (an alloy of a maleic anhydride-modified EPDM and an etheric TPU) obtained in Example 4.

FIG. 13 is an AFM photograph of a pellet cross-section of a thermoplastic elastomer alloy (an alloy of a maleic anhydride-modified EPDM and an enteric TPU) obtained in Example 7.

DESCRIPTION OF EMBODIMENTS

[Thermoplastic Resin (A)]

In the present invention, as a thermoplastic resin (A), a known thermoplastic resin can be used. The thermoplastic resin (A) can be used singly or in combinations of two or more. The thermoplastic resin (A) does not include a substance corresponding to a modified ethylene copolymer (B).

Examples of the thermoplastic resin (A) include polyurethane-based resins, polyester-based resins, polyamide-based resins, polyimide-based resins, polystyrenic resins, polycarbonate-based resins, polyolefinic resins, acrylic resins, methacrylic resins, fluororesins, silicone-based resins, polyacetal resins (polyoxymethylene), polyarylate resins, polyphenylene ethers, polyphenylene sulfides, polysulfones, polyethersulfones, polyetheretherketones, vinyl chloride resins and polyvinylic resins, but are not limited thereto as long as they are capable of dispersing a modified ethylene copolymer (B). The thermoplastic resin (A) may be used singly or plurally, or may use a multicomponent singly or plurally such as copolymers, additions, blends and alloys. The thermoplastic resin (A) has a weight-average molecular weight of, for example, 5,000 to 1,000,000, and preferably 10,000 to 500,000.

More specific examples of the thermoplastic resin (A) include, for example, polyamide-based resins such as polyamide 11, polyamide 12, polyamide 6, polyamide 66, polyamide 610, polyamide 612, polyamide 666, polyamide 46, polyamide 10T, polyamide 6T and aramid resins (whole aromatic polyamide); polyester-based resins such as polyethylene terephthalate, polybutylene terephthalate and polyethylene naphthalate; polyimide; polystyrene; polycarbonate; polyolefinic resins such as polyethylenes and polypropylenes; fluororesins such as polyvinylidene fluorides, polytetrafluoroethylenes, polyvinyl fluorides, polychlorotrifluoroethylenes, perfluoroalkoxyfluororesins, ethylene tetrafluoride-propylene hexafluoride copolymers, ethylene-ethylene tetrafluoride copolymers and ethylene-chlorotrifluoroethylene copolymers; polyacetal resins; polyethersulfones; polyetheretherketones; and polyvinylic resins such as polyvinyl alcohols and ethylene vinyl alcohols. Additives such as reinforcing fillers such as glass fibers may be incorporated in these thermoplastic resins (A). Also amorphous materials (thermoplastic resins) having no distinct melting point, in the case of being molded by a thermoplastic resin molding machine, can be incorporated. The thermoplastic resin (A) may be resins obtained from fossil raw materials and natural resins as well.

Among the above, the thermoplastic resin (A) is preferably at least one selected from the group consisting of polyamide-based resins, polyester-based resins, polycarbonate-based resins and polyacetal resins.

[Thermoplastic Elastomer (A1)]

As the thermoplastic resin (A), a thermoplastic elastomer (TPE) (A1) may be preferably used. The thermoplastic elastomer (A1) comprises a hard phase (hard segment) and a soft phase (soft segment), and though exhibiting properties as a rubber at normal temperature, is a polymer exhibiting thermoplasticity at high temperatures. Use of the thermoplastic elastomer (A1) can improve the abrasion resistance, mechanical strength and molding processability of a thermoplastic resin composition.

The thermoplastic elastomer (A1) may be used singly or as a mixture of two or more. As the thermoplastic resin (A), a thermoplastic elastomer (A1) and a resin other than a thermoplastic elastomer may be concurrently used.

Examples of the thermoplastic elastomer (A1) include polyurethane-based thermoplastic elastomers (A11), polyester-based thermoplastic elastomers (A12), polyamide-based thermoplastic elastomers (A13), polystyrenic thermoplastic elastomers (A14), fluoropolymer-based thermoplastic elastomers (A15), polyvinyl chloride-based thermoplastic elastomers (A16), polyolefinic thermoplastic elastomers (A17) and polyimide-based elastomers (A18), but are not limited thereto. The thermoplastic elastomer (A1) may also be a thermoplastic elastomer in which a resin, an elastomer and/or an oligomer component are blended (mixed). The thermoplastic elastomer (A1) may be used singly or in combinations of two or more. Among the above thermoplastic elastomers (A1), preferable are polyurethane-based thermoplastic elastomer (A11), polyester-based thermoplastic elastomers (A12) and polyimide-based thermoplastic elastomers (A13), and especially preferable are polyurethane-based thermoplastic elastomers (A11).

[Polyurethane-Based Thermoplastic Elastomer (A11)]

As the polyurethane-based thermoplastic elastomer (A11), known thermoplastic polyurethanes (TPU) can be used. The thermoplastic polyurethane can be used singly or in combinations of two or more. The thermoplastic polyurethane is usually obtained by reacting a polyisocyanate, a long-chain polyol and a chain extender, and as required, other isocyanate-reactive compounds.

The polyisocyanate is not especially limited as long as it is a compound having at least two isocyanate groups in the molecule. The polyisocyanate includes, for example, aliphatic polyisocyanates, alicyclic polyisocyanates, aromatic polyisocyanates and araliphatic (aromatic-aliphatic) polyisocyanates. The polyisocyanate can be used singly or in combinations of two or more.

Examples of the aliphatic polyisocyanate include aliphatic diisocyanates such as 1,3-trimethylene diisocyanate, 1,4-tetramethylene diisocyanate, 1,5-pentamethylene diisocyanate, 1,6-hexamethylene diisocyanate, 1,2-propylene diisocyanate, 1,2-butylene diisocyanate, 2,3-butylene diisocyanate, 1,3-butylene diisocyanate, 2-methyl-1,5-pentamethylene diisocyanate, 3-methyl-1,5-pentamethylene diisocyanate, 2,4,4-trimethyl-1,6-hexamethylene diisocyanate and 2,2,4-trimethyl-1,6-hexamethylene diisocyanate.

Examples of the alicyclic polyisocyanate include alicyclic diisocyanates such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate (isophorone diisocyanate), 4,4'-methylenebis(cyclohexyl isocyanate), methyl-2,4-cyclohexane diisocyanate, methyl-2,6-cyclohexane diisocyanate, 1,3-bis(isocyanatomethyl)cyclohexane, 1,4-bis(isocyanatomethyl)cyclohexane and norbornane diisocyanate.

Examples of the aromatic polyisocyanate include aromatic diisocyanates such as m-phenylene diisocyanate, p-phenylene diisocyanate, 2,4-tolylene diisocyanate, 2,6-tolylene diisocyanate, naphthylene 1,4-diisocyanate, naphthylene 1,5-diisocyanate, 4,4'-diphenyl diisocyanate (4,4'-biphenyl diisocyanate), 4,4'-diphenylmethane diisocyanate, 2,4'-diphenylmethane diisocyanate, 2,2'-diphenylmethane diisocyanate, 4,4'-diphenyl ether diisocyanate, 2,2'-diphenylpropane-4,4'-diisocyanate, 3,3'-dimethyldiphenylmethane-4,4'-diisocyanate and 4,4'-diphenylpropane diisocyanate.

Examples of the araliphatic polyisocyanate include araliphatic diisocyanates such as 1,3-xylylene diisocyanate, 1,4-xylylene diisocyanate, ω,ω'-diisocyanato-1,4-diethylbenzene, 1,3-bis(1-isocyanato-1-methylethyl)benzene, 1,4-bis(1-isocyanato-1-methylethyl)benzene and 1,3-bis(α,α-dimethylisocyanatomethyl)benzene.

As the polyisocyanate, suitably usable are 1,6-hexamethylene diisocyanate, 4,4'-methylenebis(cyclohexyl isocyanate), 1,3-bis(isocyanatomethyl)cyclohexane, 1,4-bis(isocyanatomethyl)cyclohexane, isophorone diisocyanate, 2,4-tolylene diisocyanate, 2,6-tolylene diisocyanate, 4,4'-diphenylmethane diisocyanate, 1,3-xylylene diisocyanate, 1,4-xylylene diisocyanate, norbornane diisocyanate and 1,3-bis(α,α-dimethylisocyanatomethyl)benzene.

As the polyisocyanate, also usable are dimers, trimers, reaction products or polymers of the above exemplified aliphatic polyisocyanates, alicyclic polyisocyanates, aromatic polyisocyanates and araliphatic polyisocyanates (for example, a dimmer or a trimer of diphenylmethane diisocyanate, reaction products of trimethylolpropane and tolylene diisocyanate, reaction products of trimethylolpropane and hexamethylene diisocyanate, polymethylene polyphenyl isocyanates, polyether polyisocyanates, polyester polyisocyanates and the like) and the like.

Examples of the long-chain polyol include polyether polyols, polyester polyols, polycarbonate polyols, polyolefin polyols and polyacryl polyols. The long-chain polyol has a number-average molecular weight of usually not less than 500, preferably 500 to 10,000, still more preferably 600 to 6,000, and further still more preferably 800 to 4,000. The long-chain polyol can be used singly or in combinations of two or more.

Examples of the polyether polyol include polyalkylene ether glycols such as polyethylene ether glycols, polypropylene ether glycols and polytetramethylene ether glycols (PTMG), and additionally copolymers containing a plurality of alkylene oxides (alkylene oxide-another alkylene oxide) as monomer components, such as ethylene oxide-propylene oxide copolymers. Among the polyether polyols, especially preferable are polytetramethylene ether glycols (PTMG).

As the polyester polyol, usable are, for example, polycondensates of a polyhydric alcohol and a polyvalent carboxylic acid, ring-opened polymers of cyclic esters (lactones), and reaction products of three components of a polyhydric alcohol, a polyvalent carboxylic acid and a cyclic ester (lactone). In the polycondensates of a polyhydric alcohol and a polyvalent carboxylic acid, as the polyhydric alcohol, usable are, for example, ethylene glycol, diethylene glycol, propylene glycol, dipropylene glycol, 1,3-propanediol, 1,3-butanediol, 1,4-butanediol, 2-methyl-1,3-propanediol, 1,5-pentanediol, neopentyl glycol, 1,6-hexanediol, 3-methyl-1,5-pentanediol, 2,4-diethyl-1,5-pentanediol, 1,9-nonanediol, 1,10-decanediol, glycerol, trimethylolpropane, trimethylolethane, cyclohexanediols (1,4-cyclohexanediol and the like), cyclohexanedimethanols (1,4-cyclohexanedimethanol and the like), bisphenols (bisphenol A and the like), and sugar alcohols (xylitol, sorbitol and the like). On the other hand, examples of the polyvalent carboxylic acid include aliphatic dicarboxylic acids such as malonic acid, maleic acid, succinic acid, glutaric acid, adipic acid, suberic acid, azelaic acid, sebacic acid and dodecanedioic acid; alicyclic dicarboxylic acids such as 1,4-cyclohexanedicarboxylic acid; and aromatic dicarboxylic acids such as terephthalic acid, isophthalic acid, ortho-phthalic acid, 2,6-naphthalenedicarboxylic acid, pare-phenylenedicarboxylic acid and trimellitic acid. In the ring-opened polymers of cyclic esters, examples of the cyclic ester include propiolactone, β-methyl-δ-valerolactone and ε-caprolactone. In the reaction products of three components, the above exemplified polyhydric alcohols, polyvalent carboxylic acids and cyclic esters and the like can be used. Among the polyester polyols, preferable are adipate-based polyester polyols [for example, C2-6 alkylene adipates such as polyethylene adipate), poly(diethylene adipate), poly(propylene adipate), poly(tetramethylene adipate), poly(hexamethylene adipate) and poly(neopentylene adipate)] which are polycondensates of adipic acid and a polyhydric alcohol (for example, one or two or more of alkane diols having 2 to 6 carbon atoms such as ethylene glycol, 1,4-butanediol, neopentyl glycol and 1,6-hexanediol), caprolactone polyols obtained by ring-opening polymerization of ε-caprolactone, polyester polyols obtained by ring-opening polymerization of β-methyl-δ-valerolactone using a polyhydric alcohol such as ethylene glycol, and the like.

Examples of the polycarbonate polyol include reaction products of a polyhydric alcohol and phosgene, a chloroformate ester, a dialkyl carbonate or a diaryl carbonate (a polyhydric alcohol and a compound selected from the group consisting of phosgene, a chloroformate ester, a dialkyl carbonate and a diaryl carbonate); and ring-opened polymers of cyclic carbonate esters (alkylene carbonates and the like). In the reaction products of a polyhydric alcohol and phosgene, as the polyhydric alcohol, specifically usable are the above exemplified polyhydric alcohols (for example, ethylene glycol, propylene glycol, 1,3-butanediol, 1,4-butanediol, neopentyl glycol, 1,5-pentanediol, 1,6-hexanediol and 1,9-nonanediol). In the ring-opened polymers of cyclic carbonate esters, examples of the alkylene carbonate include ethylene carbonate, trimethylene carbonate, tetramethylene carbonate and hexamethylene carbonate. Here, the polycarbonate polyol suffices if being a compound having carbonate bonds in the molecule and having hydroxyl groups at the terminals, and may have ester bonds together with the carbonate bonds. Typical examples of the polycarbonate polyol include poly(hexamethylene carbonate) diols, diols obtained by ring-opening addition polymerization of a lactone to a poly(hexamethylene carbonate) diol, and cocondensates of a poly(hexamethylene carbonate) diol and a polyester diol or a polyether diol.

The polyolefin polyol is a polyol having an olefin as a component of a skeleton (or a main chain) of a polymer or a copolymer, and having at least two hydroxyl groups in the molecule (particularly at the terminals). The above olefin may be an olefin (for example, an α-olefin such as ethylene or propylene) having a carbon-carbon double bond at the terminal, may be an olefin (for example, isobutene) having a carbon-carbon double bond at a site other than the terminals, or further may be a diene (for example, butadiene or isoprene). Typical examples of the polyolefin polyol include substances (compounds) obtained by modifying, with hydroxyl groups, the terminals of butadiene- or isoprene-based polymers such as butadiene homopolymers, isoprene homopolymers, butadiene-styrene copolymers, butadiene-isoprene copolymers, butadiene-acrylonitrile copolymers, butadiene-2-ethylhexyl acrylate copolymers, butadiene-n-octadecyl acrylate copolymers.

The polyacryl polyol is a polyol having a (meth)acrylate as a component of a skeleton (or a main chain) of a polymer or a copolymer, and having at least two hydroxyl groups in the molecule (particularly at the terminals). As the (meth) acrylate, suitably used are alkyl(meth)acrylate esters [for example, C1-20 alkyl(meth)acrylate esters]. As the polyol, every material other than materials cited here can be used.

As the chain extender, usable are chain extenders usually used in production of thermoplastic polyurethanes, and the type thereof is not especially limited, and low-molecular weight polyols and polyamines and the like can be used. The chain extender has a molecular weight of usually less than 500, and preferably not more than 300. The chain extender can be used singly or in combinations of two or more.

Typical examples of the chain extender include polyols (particularly, diols) such as ethylene glycol, diethylene glycol, propylene glycol, 1,3-propanediol, 1,3-butanediol, 1,4-butanediol, 1,5-pentanediol, 1,2-pentanediol, 2,3-pentanediol, neopentyl glycol, 1,6-hexanediol, 3-methyl-1,5-pentanediol, 1,4-cyclohexanediol and 1,4-cyclohexanedimethanol, and polyamines (particularly, diamines) such as hexamethylenediamine, 3,3'-dimethyl-4,4'-diaminodicyclohexylmethane and 4,4'-methylenebis-2-chloroaniline. Among these, diols are especially preferable.

As the thermoplastic polyurethane, preferable are thermoplastic polyurethanes obtained by reacting a polyisocyanate, a long-chain polyol and a chain extender in the range of the ratio (NCO/isocyanate-reactive groups), of the molar number of isocyanate groups of the polyisocyanate and the molar number of isocyanate-reactive groups (hydroxyl group, amino group and the like) of the long-chain polyol and the chain extender, of 0.9 to 1.3, especially 0.95 to 1.1. The proportion of the long-chain polyol to the chain extender, [the former/the latter (molar ratio)], can suitably be selected in the range of, for example, 0.1 to 1.0, and preferably 0.2 to 2, according to physical properties and the like of the thermoplastic polyurethane. In the above reaction, in order to promote the reaction, as required, a catalyst such as a tertiary amine, an organometal compound or a tin compound may be used.

The thermoplastic polyurethane usually has a weight-average molecular weight Mw of 5,000 to 1,000,000. The thermoplastic polyurethane has thermoplasticity, though some exhibit no distinct melting point. The thermoplastic polyurethane can be molded by a common thermoplastic resin molding machine such as extrusion, injection molding, heat press or the like.

The hardness of the thermoplastic polyurethane is, but not limited to, from the viewpoint of raising mechanical properties of the thermoplastic resin composition (thermoplastic elastomer alloy and the like) according to the present invention, preferably not less than 60 (for example, 60 to 96), more preferably not less than 78 (for example, 78 to 96), still more preferably not less than 89 (for example, 89 to 95), and especially preferably not less than 91 (for example, 91 to 94), in hardness of JIS K6253 (durometer type A). From the viewpoint of letting the thermoplastic resin composition (thermoplastic elastomer alloy and the like) have reasonable flexibility and raising the bending fatigue resistance, the thermoplastic polyurethane has a hardness in the range of, for example, 60 to 93, and especially preferably 78 to 91 (particularly 78 to 88).

The thermoplastic polyurethane preferably uses a polyester polyol or a polyether polyol as the long-chain polyol. Among these, the thermoplastic polyurethane is especially preferably adipate-based TPUs using an adipate-based polyester polyol as the long-chain polyol, caprolactone-based TPUs using a caprolactone polyol as the long-chain polyol, and PTMG-based TPUs using a polytetramethylene ether glycol (PTMG) as the long-chain polyol.

As the thermoplastic polyurethane, commercially available products can be used. Examples of the commercially available products include an adipate-based TPU of 80 in hardness (an adipate-based TPU with a hardness of 80, a hardness of 80), an adipate-based TPU of 90 in hardness, a caprolactone-based TPU of 90 in hardness, a PTMG-based TPU of 92 in hardness, and an adipate-based TPU of 92 in hardness.

[Polyester-Based Thermoplastic Elastomer (A12)]

As the polyester-based thermoplastic elastomer (A12), known polyester-based thermoplastic elastomers can be used. The polyester-based thermoplastic elastomer (A12) can be used singly or in combinations of two or more. The polyester-based thermoplastic elastomer (A12) can be produced by a known method such as the esterification reaction or the transesterification reaction.

The polyester-based thermoplastic elastomer (A12) is preferably, for example, polyester-based thermoplastic elastomers having as main constituting units a hard segment composed of an aromatic polyester unit and a soft segment composed of an aliphatic polyether unit and/or an aliphatic polyester unit.

The aromatic polyester unit is mainly a unit formed of an aromatic dicarboxylic acid or an ester-forming derivative thereof (a C1-4 alkyl ester, an acid halide or the like) and a dial or an ester-forming derivative thereof (an acetylated derivative, an alkaline metal salt or the like). Specific examples of the aromatic dicarboxylic acid include terephthalic acid, isophthalic acid, phthalic acid, naphthalene-2,6-dicarboxylic acid, naphthalene-2,7-dicarboxylic acid, anthracenedicarboxylic acid, diphenyl-4,4'-dicarboxylic acid (biphenyl-4,4'-dicarboxylic acid), diphenoxyethanedicarboxylic acid, 4,4'-diphenyl ether dicarboxylic acid, 5-sulfoisophthalic acid and sodium 3-sulfoisophthalate. Specific examples of the diol include diols having a molecular weight of not more than 400, and include, for example, aliphatic dials such as 1,4-butanediol, ethylene glycol, trimethylene glycol, pentamethylene glycol, hexamethylene glycol and neopentyl glycol, decamethylene glycol; alicyclic diols such as 1,1-cyclohexanedimethanol, 1,4-dicyclohexanedimethanol and tricyclodecanedimethanol; and aromatic diols such as xylylene glycol, bis(p-hydroxy)diphenyl(bis(p-hydroxy)biphenyl), bis(p-hydroxy)diphenylpropane, 2,2'-bis[(4-(2-hydroxyethoxy)phenyl)]propane, bis[4-(2-hydroxyethoxy)phenyl]sulfone, 1,1-bis[4-(2-hydroxyethoxy)phenyl]cyclohexane and 4,4'-dihydroxy-p-terphenyl. These aromatic dicarboxylic acids or ester-forming derivatives thereof, and diols and ester-forming derivatives thereof may be concurrently used in two or more, respectively. Preferable aromatic polyester units include a polybutylene terephthalate unit derived from terephthalic acid and/or dimethyl terephthalate and 1,4-butanediol, and a unit composed of a polybutylene terephtalate unit derived from terephthalic acid and/or dimethyl terephthalate and a polybutylene isophtalate unit derived from isophthalic acid and/or dimethyl isophthalate and 1,4-butanediol.

Examples of an aliphatic polyether constituting the aliphatic polyether unit include poly(ethylene oxide)glycols, poly(propylene oxide)glycols, poly(tetramethylene oxide)glycols, poly(hexamethylene oxide)glycols, copolymers of ethylene oxide and propylene oxide, ethylene oxide addition polymers of poly(propylene oxide)glycols and copolymer glycols of ethylene oxide and tetrahydrofuran. Among these, preferable are poly(tetramethylene oxide)glycols, ethylene oxide addition products of poly(propylene oxide)glycols and copolymer glycols of ethylene oxide and tetrahydrofuran. Examples of an aliphatic polyester constituting the aliphatic polyester unit include poly($\epsilon$-caprolactone)s, polyenantholactones, polycaprolactones, polybutylene adipates and polyethylene adipates. Among these, preferable are poly($\epsilon$-caprolactone)s, polybutylene adipates, polyethylene adipates, and the like.

The soft segment composed of an aliphatic polyether unit and/or an aliphatic polyester unit has a number-average molecular weight of preferably 300 to 6,000, and especially preferably 500 to 4,000, in the copolymerized state.

The ratio of the hard segment composed of an aromatic polyester unit and the soft segment composed of an aliphatic polyether unit and/or an aliphatic polyester unit in the polyester-based thermoplastic elastomer is not especially limited, but is, for example, the former/the latter (weight ratio)=1/99 to 99.5/0.5, and preferably 50/50 to 99/1.

[Polyamide-Based Thermoplastic Elastomer (A13)]

As the polyamide-based thermoplastic elastomer (A13), known polyamide-based thermoplastic elastomers can be used. The polyamide-based thermoplastic elastomer (A13) can be used singly or in combinations of two or more.

As the polyamide-based thermoplastic elastomer (A13), preferable are, for example, polyamide-based thermoplastic elastomers having as main constituting units a hard segment composed of a polyamide unit and a soft segment composed of an aliphatic polyether unit and/or an aliphatic polyester unit.

Examples of a polyamide constituting the polyamide unit include nylon 6, nylon 66, nylon 11 and nylon 12. Examples of an aliphatic polyether constituting the aliphatic polyether unit include the same aliphatic polyethers as exemplified in the term of the polyester-based thermoplastic elastomer. Among these, preferable are poly(tetramethylene oxide) glycols, ethylene oxide additions of poly(propylene oxide) glycols, and copolymer glycols of ethylene oxide and tetrahydrofuran. Examples of an aliphatic polyester constituting the aliphatic polyester unit include the same aliphatic polyesters as exemplified in the term of the polyester-based thermoplastic elastomer. Among these, preferable are poly($\epsilon$-caprolactone)s, polybutylene adipates, polyethylene adipates, and the like.

[Other Thermoplastic Elastomers]

As the polystyrenic thermoplastic elastomer (A14), the fluoropolymer-based thermoplastic elastomer (A15), the polyvinyl chloride-based thermoplastic elastomer (A16), the polyolefinic thermoplastic elastomer (A17) and the polyimide-based elastomer (A18), usable are respective known elastomers.

As the thermoplastic resin (A), from the viewpoint of the adhesion with a modified ethylene copolymer (B), preferable are resins having, in the molecule (for example, on the main chain, terminals and side chains of a polymer), functional groups (or functional groups having affinity) reactive, in heating and mixing, with modifying groups (for example, a carboxyl group or its salt, a carboxylate ester group, an acid anhydride group, a carboxylic acid halide group, an amido group, an imido group, a glycidyl group (epoxy group), a halogen atom, an amino group, an imido group, a phosphino group, a thioxy group and a silicon-containing group, which will be described later) of the modified ethylene copolymer (B). Examples of such a resin include thermoplastic resins having, on the terminals of a polymer main chain, functional groups such as a hydroxyl group, a carboxyl group, an amino group and a thiol group, for example, polyamide-based resins, polyester-based resins, polycarbonate-based resins, polyacetal resins, polyphenylene ethers, polyphenylene sulfides, polyurethane-based thermoplastic elastomers (A11), polyester-based thermoplastic elastomers (A12) and polyamide-based thermoplastic elastomers (A13).

[Modified Ethylene Copolymer (B)]

In the present invention, as the modified ethylene copolymer (B), usable are known modified ethylene copolymers. The modified ethylene copolymer (B) can be used singly or in combinations of two or more. The modified ethylene copolymer (B) has a weight-average molecular weight of, for example, 5,000 to 1,000,000, and preferably 10,000 to 500,000.

The modified ethylene copolymer (B) is an ethylene copolymer modified with an unsaturated carboxylic acid or a derivative thereof or another functional group. Examples of the ethylene copolymer include copolymers of ethylene with at least one monomer component selected from the group consisting of (i) olefin components except for ethylene, (ii) diene components and (iii) ester components having an ethylenically unsaturated group. Examples of the olefin component except for ethylene include α-olefins having 3 to 12 carbon atoms such as propylene, 1-butene, 1-pentene, 1-hexene, 1-heptene, 1-octene and 1-decene. Examples of the diene component include non-conjugated dienes such as ethylidene norbornene, dicyclopentadiene and 1,4-hexadiene. Examples of the ester component having an ethylenically unsaturated group include alkyl(meth)acrylate esters such as methyl(meth)acrylate and ethyl(meth)acrylate, and vinyl carboxylate esters such as vinyl acetate and vinyl propionate.

Typical examples of the ethylene copolymer include ethylene-propylene-diene copolymers (ethylene-propylene-diene rubbers; EPDM), ethylene-propylene copolymers (ethylene-propylene rubbers; EPM), ethylene-methyl(meth)acrylate copolymers, ethylene-ethyl(meth)acrylate copolymers and ethylene-vinyl acetate copolymers. Among these, especially preferable are ethylene-propylene-diene copolymers (ethylene-propylene-diene rubbers; EPDM) and ethylene-propylene copolymers (ethylene-propylene rubbers; EPM).

Examples of an unsaturated carboxylic acid used for modification of the ethylene copolymer include acrylic acid, methacrylic acid, maleic acid, fumaric acid, tetrahydrophthalic acid, itaconic acid, citraconic acid, crotonic acid, isocrotonic acid and norbornenedicarboxylic acid. Examples of a derivative of an unsaturated carboxylic acid include esters of unsaturated carboxylic acids [for example, glycidyl (meth)acrylate and maleate esters], acid anhydrides (maleic anhydride and the like), salts, acid halides, amides and imides. An ethylene copolymer modified with an unsaturated carboxylic acid or a derivative thereof has, in the molecule, a carboxyl group or a salt thereof, a carboxylate ester, an acid anhydride group, a carboxyl acid halide group, an amido group, an imido group or the like.

Other functional groups used for modification of the ethylene copolymer are not especially limited as long as they are capable of chemically modifying the ethylene copolymer. The other functional groups include, for example, a glycidyl group (epoxy group), a halogen atom, an amino group, an imido group, a phosphino group, a thioxy group, a silicon atom-containing group. These functional groups may be incorporated singly or in two or more.

Modification of an ethylene copolymer can be carried out, for example, by heating and kneading the ethylene copolymer and an unsaturated carboxylic acid or a derivative thereof in the presence of a graft polymerization initiator [for example, a peroxide initiator such as 1,3-bis(t-butylperoxyisopropyl)benzene or dicumyl peroxide]. Modification of an ethylene copolymer can be carried out also by further using an unsaturated carboxylic acid (acrylic acid, methacrylic acid or the like) as another comonomer when ethylene and a comonomer such as an ester having an ethylenically unsaturated bond [methyl(meth)acrylate, ethyl(meth)acrylate, vinyl acetate or the like] are copolymerized. Further, modification of an ethylene copolymer with the above another functional group can also be carried out by a known method. Modification may use a chemical reaction such as random copolymerization, alternating copolymerization, block copolymerization or graft copolymerization, may use a state of a reaction intermediate, or may use a physical modification such as addition, coexistence or generation.

The modification ratio with an unsaturated carboxylic acid or a derivative thereof or the another functional group in the modified ethylene copolymer (B) is, as a content rate of a structural unit containing groups originated (derived) from the unsaturated carboxylic acid or the derivative thereof, or a structural unit containing the another functional group, for example, about 0.1 to 20 wt %, preferably about 0.5 to 10 wt %, and still more preferably about 1 to 8 wt %, with respect to the whole modified ethylene copolymer (a whole amount of the modified ethylene copolymer). If the content rate is too low, the improving effect of the abrasion resistance and the bending fatigue resistance in blending with a thermoplastic resin (A) is liable to become small. By contrast, if the content rate is too high, properties as a copolymer intrinsic to an ethylene copolymer become liable to decrease, making difficult the maintenance of the copolymer and also making difficult the regulation of the properties.

The modification of an ethylene copolymer may be carried out independently for the ethylene copolymer before being blended with a thermoplastic resin, or may be carried out simultaneously in a stage of blending a before-modification ethylene copolymer with a thermoplastic resin. An unreacted carboxylic acid or derivative thereof may be removed, or may be used as it remains.

The modified ethylene copolymer (B) is preferably a copolymer, modified with an unsaturated carboxylic acid or a derivative thereof, of ethylene with at least one monomer component selected from the group consisting of (i) olefin components except for ethylene (particularly, α-olefins containing at least propylene), (ii) diene components and (iii) ester components having an ethylenically unsaturated group. Among these, especially preferable are polymers obtained by modifying a copolymer of ethylene, an olefin except for ethylene (particularly, α-olefin containing at least propylene) and/or a diene with an unsaturated carboxylic acid or a derivative thereof (particularly maleic anhydride).

A preferable modified ethylene copolymer (B) includes modified ethylene-propylene-diene copolymerized rubbers (modified EPDM) (B1), modified ethylene-propylene rubbers (modified EPM) (B2) and carboxylic acid-modified ethylene acryl rubbers (acid-modified ethylene acryl elastomers) (B3). Among these, preferable are modified ethylene-propylene-diene copolymerized rubbers (modified EPDM) (B1).

[Modified Ethylene-Propylene-Diene Copolymerized Rubber (B1)]

In the present invention, as the modified ethylene-propylene-diene copolymerized rubber (B1) (modified EPDM), usable are known modified ethylene-propylene-diene copolymerized rubbers. The modified ethylene-propylene-diene copolymerized rubber (B1) can be used singly or in combinations of two or more.

An ethylene-propylene-diene copolymer (EPDM) is a copolymer of ethylene, propylene and a non-conjugated diene. Examples of the diene include 5-ethylidene-2-norbornene, dicyclopentadiene and 1,4-hexadiene. A modified ethylene-propylene-diene copolymerized rubber (modified EPDM) (B1) used in the present invention is obtained by modifying an EPDM with, for example, an unsaturated carboxylic acid or a derivative thereof (an ester, an acid anhydride, a salt, an acid halide, an amide, an imide, or the like) or another functional group. Examples of the unsaturated carboxylic acid or the derivative thereof include, as in the above, acrylic acid, methacrylic acid, maleic acid, fumaric acid, tetrahydrophthalic acid, itaconic acid, citraconic acid, crotonic acid, isocrotonic acid, norbornenedicarboxylic acid, glycidyl(meth)acrylate, maleate esters and maleic anhydride, and the unsaturated carboxylic acid or the derivative thereof may have a structure of an ester salt, a metal salt thereof and the like. Among these, preferable are acrylic acid, methacrylic acid and maleic anhydride, and especially preferable is maleic anhydride. The another functional group includes, for example, a glycidyl group, a halogen atom, an amino group, an imido group, a phosphino group and a thioxy group.

Modification of an EPDM can be carried out, for example, by heating and kneading the EPDM and an unsaturated carboxylic acid or a derivative thereof in the presence of a graft polymerization initiator [for example, a peroxide initiator such as 1,3-bis(t-butylperoxyisopropyl)benzene or dicumyl peroxide]. The ratio of ethylene and propylene in an EPDM used as a raw material is, from the viewpoint of properties thereof as an elastomer, and the like, for example, the former/the latter (weight ratio)=10/90 to 95/5, and preferably about 50/50 to 85/15. The content rate of a structural unit originated from a diene component in an EPDM is, for example, about 0.1 to 25 wt %, preferably about 1 to 20 wt %, and more preferably about 2 to 10 wt %, to the whole EPDM.

The modification ratio with an unsaturated carboxylic acid or a derivative thereof in the modified ethylene-propylene-diene copolymerized rubber (B1) is, as a content rate of a structural unit originated from the unsaturated carboxylic acid or the derivative thereof, for example, about 0.1 to 20 wt %, preferably about 0.5 to 10 wt %, and more preferably about 1 to 8 wt %, with respect to the whole modified EPDM (a whole amount of the modified EPDM). If the content rate is too low, the improving effect of the abrasion resistance and the bending fatigue resistance in blending with a thermoplastic resin (A) [for example, the polyurethane-based thermoplastic elastomer (A1)] is liable to become small. By contrast, if the content rate is too high, the function as an elastomer becomes liable to decrease.

The modification of an EPDM may be carried out independently for the EPDM before being blended with a TPU, or may be carried out simultaneously in a stage of blending a before-modification EPDM with a TPU. An unreacted carboxylic acid or a derivative thereof may be removed, or may be used as it remains.

The modified ethylene-propylene-diene copolymerized rubber (B1) has a melt flow rate (ASTM D1238, 280° C./2.16 kg) of, for example, 5 to 80 g/10-min, and preferably 10 to 40 g/10-min.

As the modified ethylene-propylene-diene copolymerized rubber (B1), commercially available products may be used. Examples of the commercially available product include "Fusabond N416" by trade name (maleic anhydride-modified EPDM, Du Pont K.K.).

A modified ethylene-propylene-diene copolymerized rubber (B1) to become a dispersoid in a resin composition may be crosslinked, or uncrosslinked. For example, dynamic crosslinking means, in which crosslinking is carried out with thermoplasticity being maintained, may be used.

Although a modified ethylene-propylene-diene copolymerized rubber (B1) is often crosslinked and then utilized as industrial rubber products so far, and has not been so much used as a modifier for other resins, it has been found according to the present invention that making the copolymerized rubber dispersed and contained in a thermoplastic resin can remarkably improve properties of the thermoplastic resin.

As the modified ethylene-propylene copolymerized rubber (modified EPM) (B2) as well, known modified ethylene-propylene copolymerized rubbers can be used. The modified ethylene-propylene copolymerized rubber can be used singly or in combinations of two or more. An ethylene-propylene copolymer (EPM) is a copolymer of ethylene and propylene, and the modification of the EPM can be carried out similarly to the modification of the EPDM. As the acid-modified ethylene acryl elastomer (B3) as well, known acid-modified ethylene acryl elastomers can be used. The acid-modified ethylene acryl elastomer (B3) can be used singly or in combinations of two or more.

[Thermoplastic Resin Composition]

The thermoplastic resin composition according to the present invention is a resin composition comprising the thermoplastic resin (A) and the modified ethylene copolymer (B), and obtained by dispersing the modified ethylen copolymer (B) into the thermoplastic resin (A), as described above.

In the present invention, the weight proportion [(B)/(A)] of the (B) to (A) is, though depending on the kinds of the components (A) and (B), usually in the range of 0.1/99.9 to 60/40. The lower limit of the proportion (ratio) is preferably 1/99, more preferably 3/97, and especially preferably 7.5/92.5; and the upper limit thereof is preferably 55/45, more preferably 50/50, still more preferably 30/70, and especially preferably 25/75 (particularly, 22/78). More specifically, the weight proportion [(B)/(A)] of the (B) to (A) is preferably 0.1/99.9 to 30/70, more preferably 1/99 to 25/75, and still more preferably 3/97 to 22/78 (particularly, 7.5/92.5 to 22/78). If the proportion is too low, the improving effect of the durability of the abrasion resistance, and the bending fatigue resistance becomes small. By contrast, if the proportion is too high, properties (mechanical strength and the like) intrinsic to the thermoplastic resin become liable to decrease.

The present inventors have found that in a resin composition which is obtained by dispersing the modified ethylene copolymer (B) into the thermoplastic resin (A) and comprises the thermoplastic resin (A) and the modified ethylene copolymer (B), the durability such as the bending fatigue resistance of molded articles of the resin composition exhibits a more improved value than a value anticipated for the each material as a single material. That is, it has been found that an actually acquired value of the bending fatigue resistance of a blend of a thermoplastic resin (A) and a modified ethylene copolymer (B) is higher than a value thereof calculated on the assumption of the additivity being held in the blend, thus providing a synergistic effect. For example, in FIG. 5 [which is a graph indicating a relationship between the blend ratio (wt %) of a modified ethylene copolymer (MAH-EPDM) and the bending fatigue resistance, based on data of Examples and Comparative Examples described later], a line (dotted line in FIG. 5) connecting values of the bending numbers of times by a straight line in the cases of the blend ratio of MAH-EPDM being 0 wt % and 100 wt % indicates values of the bending numbers of times in respective blend ratios on the assumption of the additivity being held. By contrast, the result of a resin composition (solid line in FIG. 5) is a result of the bending numbers of times, which are by far more than the dotted line, thus being conceivably a synergistic effect. The synergistic effect is large in the case of using a thermoplastic elastomer (A1) as the thermoplastic resin (A) (for example, a polyurethane-based thermoplastic elastomer), and is remarkable particularly in the case of using a modified ethylene-propylene-diene copolymerized rubber as the modified ethylene copolymer (B).

In the thermoplastic resin composition according to the present invention, in addition to the above (A) and (B), as required, additives can be blended. Examples of the additives include antioxidants, ultraviolet absorbers, plasticizers, stabilizers, mold lubricants, surfactants, antistatic agents, electroconductive materials, colorants (pigments, dyes), flame retardants, foaming agents, slip agents, lubricants, bulking agents, crosslinking agents, solvents, developing solutions, extenders, waxes, oils, greases, processing aids, processing agents, reinforcing materials, fillers, antiblocking agents and antiaging agents.

In the thermoplastic resin composition according to the present invention, in addition to the above (A) and (B), as required, reinforcing materials can be incorporated. Examples of the reinforcing materials include fibers, powders, clothes, substrate materials, long fibers, short fibers, glass clothes, fabrics, carbon nanotubes, fullerenes, graphites, carbon blacks, silicas, foams, beads, inorganic fillers, heat dissipation fillers, electroconductive fillers, ceramics, fine ceramics and carbon fibers.

In the thermoplastic resin composition according to the present invention, the total content of the thermoplastic resin (A) and the modified ethylene copolymer (B) is, for example, not less than 60 wt %, preferably not less than 80 wt %, and more preferably not less than 90 wt %.

The modified ethylene copolymer (B) in the thermoplastic resin composition according to the present invention has an average dispersed particle aspect ratio (=major diameter/minor diameter) of 1 to 3.5, preferably 1 to 3, and more preferably 1 to 2. An average dispersed particle aspect ratio near 1 means that in an actual thermoplastic resin composition, the disperse shape of the (B) dispersed is near a true sphere. Here, the average dispersed particle aspect ratio is calculated from a major diameter/a minor diameter of island phases (disperse phase) in a planarized visual field when a disperse state of a material at an arbitrary place of a thermoplastic resin composition is observed by known means (SEM, TEM, AFM or the like). The modified ethylene copolymer (B) in the thermoplastic resin composition according to the present invention has an average dispersed particle diameter of not more than 3 μm, and preferably not more than 1 μm. An average dispersed particle aspect ratio nearer 1, that is, nearer a true sphere, is better. A smaller average dispersed particle diameter is better. If the average dispersed particle aspect ratio is in the above range, since the degree of anisotropicity is very low and there is no directivity, a high rigidity is exhibited on stresses from every direction. Consequently, the dispersed particle exhibits the effect as a reinforcing filler in every direction.

Molded articles in the disperse state as described above are resultantly concluded to be improved in durability, for example, to an instantaneous stress or a stress repeated for a long time. The phenomenon of abrasion, stress crack or solvent crack is a phenomenon in which in thermoplastic resin molded articles causing the phenomenon, originally present countless invisible flaws and incisions are subjected to stimuli, stresses or stress concentrations from outside, or notches and the like directly made from the outside make starting points, so that crazes are generated and grow further to cracks, and finally lead to strength decrease and fracture of the resin molded articles. Although there are cases where crazes on the way stage are a few, a large number of crazes are already present on sites having been subjected to stresses in molded articles in many cases, and the crazes are sometimes united to thereby grow as cracks. That is, incisions to become micro-starting points, through phenomena such as growth, linking, branching and deepening, grow into crazes and cracks. Since the crack growth is a result of that an elastic energy of a molded article withstanding a stress exceeds a surface energy of the molded article, the crack is a physical phenomenon developed as a result that the surface energy cannot support the molded article. Here, in the case of molded articles constituted of usual single materials, it is remarkably difficult to suppress growth of incisions and generated crazes, which allows easy growth according to the stress, and finally leads to breakage. The breakage means not only a large fracture of the whole but also includes fractures in microscopical areas. The surface energy as a crack resistance is highest in a spherical shape; and that a dispersoid is spherical provides a large resistance to cracks in the dispersoid, resultantly providing a large resistance of a resin layer as a disperse medium to cracks. Impartation of such an inhomogeneous structure can provide a thermoplastic resin composition better in durability than the case of being of a homogeneous structure, in deformations, movements, works and loads (which mean usage in various types of dynamic fatigues such as abrasion tests, bending fatigue tests, impact resistance tests, fracture tests, and actual usage and specifications) whereby incisions, crazes, cracks and notches cause fracture, breakage, chipping and checking.

Use of the thermoplastic resin composition according to the present invention retard the growth of incisions, crazes, cracks, notches and the like in microscopical regions, and can thus retard cracking and fracture of molded articles and can resultantly prevent serious damage, because resisting effects including relaxation, dispersion and adsorption of the initial-stage stress concentration when the incisions and the like in the microscopical regions start to grow are attained because of being a micro phase separation structure having a nearly spherical disperse phase. From the above, it is conceivable that since the disperse state is a micro inhomogeneous state of a sea-island structure in which a nearly spherical island component is micro-dispersed, and is a micro-dispersion of a viscoelastic material having a relatively flexible property, the disperse phase can absorb the energy and becomes an energy buffering material to the growth and linking and the like of cracks, and effectively suppresses the growth of cracks and the like particularly in the initial period. In the present invention, if the average dispersed particle diameter and the average dispersed particle aspect ratio are in the above ranges, the energy adsorption efficiency is remarkably high. Therefore, molded articles obtained from the thermoplastic resin composition according to the present invention are excellent not only in the abrasion resistance but remarkably excellent in the durability such as the bending fatigue resistance, and are remarkably suppressed in damage such as abrasion and cracks even if the molded articles are used in the state of being imparted with a large load for a long time or repeatedly imparted with a load, thus remarkably elongating the life. Besides, even if the island component is of a micro spherical particle shape, if the component amount is increased, the restraint of the island component progresses;

so heat becomes liable to be generated due to stresses and movements to which the molded articles are subjected; thus, separation is caused between the sea component and the island component in repeated deformation for a long time, which leads to the generation of cracks. From the above, the most preferable blend according to the present invention is such that the (B) in an elastomer form is dispersed in an average dispersed particle aspect ratio of 1 to 1.6 and an average dispersed particle diameter of not more than 3 μm, and [(B)/(A)] is 3/97 to 60/40. With these factors in these ranges, particularly the growth of incisions, crazes, cracks, notches and the like in the resin composition is suppressed also in the case where the resin composition is subjected to a stress concentration and a repeated stress, whereby molded articles excellent in the durability in dynamic applications can be provided.

The average dispersed particle aspect ratio and the average dispersed particle diameter can be measured by a scanning electron microscope (SEM), a transmission electron microscope (TEM), further an atomic force microscope (AFM), and the like.

The hardness of the thermoplastic resin composition according to the present invention is not especially limited, but the hardness in JIS K6253 (durometer type A) is preferably not less than 60 (for example, 60 to 95), more preferably not less than 78 (for example, 78 to 95), still more preferably not less than 89 (for example, 89 to 95), and especially preferably not less than 91 (for example, 91 to 95). From the viewpoint of having a reasonable flexibility and enhancing the bending fatigue resistance, the hardness of the thermoplastic resin composition is, for example, in the range of 60 to 93, and especially preferably in the range of 77 to 91 (particularly 77 to 88). The hardness of the thermoplastic resin composition can be regulated by the hardness of a thermoplastic resin (A), the weight proportion of the modified ethylene copolymer (B) to the thermoplastic resin (A), the kinds and amounts of additives, and the like.

The breaking strength (JIS K7311) of the thermoplastic resin composition according to the present invention depends largely on a resin to become a continuous phase (sea phase), but is, for example, 25 to 100 MPa, preferably 30 to 80 MPa, and more preferably 35 to 75 MPa; and the breaking elongation (JIS K7311) is, for example, 300 to 1,000%), preferably 350 to 800%, and more preferably 400 to 700%.

The thermoplastic resin composition according to the present invention can be produced by mixing the thermoplastic resin (A), the modified ethylene copolymer (B), and the additives used according to needs by the same method as the case of preparing usual polymer alloys or polymer blends. For example, the thermoplastic resin composition can be produced by pre-mixing the thermoplastic resin (A), the modified ethylene copolymer (B), and the additives used according to needs in predetermined proportions, and thereafter, kneading the mixture under heating, under pressure, in the presence of a solvent or the like by using a single-screw extruder, a twin-screw extruder, a mixing roll, a Banbury mixer, a batch-type kneader, a reactor, a reactive molding machine, an injection molding machine or the like. In the case of carrying out heating and kneading using an extruder, the composition is extruded in a strand form, and may be cut into a suitable length to thereby make a granule such as a pellet. Besides the above method, the thermoplastic resin composition can be produced also by charging and mixing the modified ethylene copolymer (B) and/or the additives during the production of the thermoplastic resin (A). In the case of using a thermoplastic elastomer (A1) such as a thermoplastic polyurethane (polyurethane-based thermoplastic elastomer) as the thermoplastic resin (A), a thermoplastic elastomer alloy can be obtained.

The average dispersed particle aspect ratio and the average dispersed particle diameter of the modified ethylene copolymer (B) in the thermoplastic resin composition according to the present invention can be regulated by the kinds and the degrees of crosslinking of the thermoplastic resin (A) and the modified ethylene copolymer (B), the viscosity ratio and the volume ratio of the thermoplastic resin (A) and the modified ethylene copolymer (B), the magnitude of a shearing force impressed in kneading a mixture containing the thermoplastic resin (A) and the modified ethylene copolymer (B), and the like. In more detail, the disperse state of the composition can be controlled by regulating respective amounts (vol %) and shearing viscosities of the thermoplastic resin (A) and the modified ethylene copolymer (B) and regulating a molding method and the like, for example, at a temperature and a shearing rate at which both the thermoplastic resin (A) and the modified ethylene copolymer (B) become flowable. In a completely incompatible blend system, the case where one component has a higher vol % than the other or the case where one component has a lower shearing viscosity than the other basically takes a sea-island structure; and the higher-vol % and/or lower-shearing viscosity component forms a sea side (continuous phase). The case where respective vol % and shearing viscosities approach closely provides a structure in which both components form micro-continuous phases. On the other hand, the case where the shearing viscosity of a sea component becomes higher than that of an island component due to a reaction of the components during kneading includes a case where the sea-island structure reverses during the kneading; and a dual-continuous phase develops, though being a very complicate structure, during the phase transformation. The reaction used here may be a crosslinking (curing) of one component, or may involve a viscosity decrease due to a molecular weight decreasing phenomenon by transesterification, hydrolysis and the like of the other component. In the case of a dual-continuous phase, although the average dispersed particle aspect ratio becomes large, since a shearing force can be most highly transmitted to both components, a micro-dispersion can be provided if kneading is carried out through this process. Further in a sea-island structure, with respect to the shape of the island side, a shape near a spherical one is resultantly obtained in the case where an island-side resin is strongly and quickly kneaded in a sea-side resin having a relatively low shearing viscosity as compared with the island side rather than in the case where both the components have shearing viscosities close to each other. That is, in order to obtain micro-dispersing and spherical dispersing shape, the viscosity condition, the volume ratio condition and the like of both the components are usually different. For example, in a reaction-type polymer blend, by reasonably determining the kneading condition and the addition condition, the spherical dispersion and the micro-dispersion can be both satisfied simultaneously. For example, by using the above-mentioned resin kneading machine for a suitable time (for example, 30 sec to 15 min) and at a suitable shearing force according to the materials and the like, the average dispersed particle aspect ratio and the average dispersed particle diameter of the modified ethylene copolymer (B) can be made in the above-mentioned range. At this time, the charging amount and charging timing are determined according to the shearing viscosity of each component. The composition is returned to normal temperature at a rate as near quenching as possible so that these disperse states are not destroyed. Thereby, a thermoplastic resin composition having a desired fixed disperse state can be obtained. As described above, the simultaneous satisfaction of both the spherical dispersion and the micro-dispersion is difficult. However, by designing the viscosities, the amounts and the kinds of components of a resin composition, the kneading method and the molding condition, the present invention can achieve the simultaneous satisfaction of both, and can obtain a thermoplastic resin composition excellent in the durability.

The thermoplastic resin composition according to the present invention can be subjected to melt molding, thermal processing, press molding and the like, and can provide various types of molded articles by an optional method such as extrusion, injection molding, blow molding, calendar molding, casting, coating, sheeting and lamination.

A production method of molded articles of the thermoplastic resin composition according to the present invention is not especially limited; molding may be carried out after the thermoplastic resin composition is fabricated in advance, or the thermoplastic resin composition according to the present invention can also be produced simultaneously when molding is carried out (for example, a side feed system and a dry blend system). The side feed system is a method in which for example, two components are charged from different feeders to an extruder in order to regulate mutual melt states to be blended in a polymer blend. The dry blend system involves mixing resin materials to be blended in a pellet form in advance and charging the mixture in the state in a molding machine (a resin molding machine such as an extruder or an injection molding machine). The thermoplastic resin composition according to the present invention suffices if holding thermoplasticity in the fabrication time of the composition, and after the fabrication, may or may not have the thermoplasticity. There are cases where a final product is a resin composition having no thermoplasticity, for example, by addition of a crosslinking agent.

[Thermoplastic Elastomer Alloy]

The thermoplastic resin composition being a thermoplastic elastomer alloy according to the present invention (hereinafter, simply referred to as the "thermoplastic elastomer alloy according to the present invention" in some cases) is, for example, a composition comprising the polyurethane-based thermoplastic elastomer (A11) and the modified ethylene-propylene-diene copolymerized rubber (B1), and obtained by dispersing the modified ethylene-propylene-diene copolymerized rubber (B1) into the polyurethane-based thermoplastic elastomer (A11) (a composition which comprises the polyurethane-based thermoplastic elastomer (A11) and the modified ethylene-propylene-diene copolymerized rubber (B1) and is obtained by dispersing the modified ethylene-propylene-diene copolymerized rubber (B1) into the polyurethane-based thermoplastic elastomer (A11)). Molded articles obtained from such a thermoplastic elastomer alloy are excellent not only in the abrasion resistance but also remarkably excellent in the bending fatigue resistance, and remarkably suppressed in damage such as abrasion and cracks even if being used in the state of being subjected to a large load for a long time, thus exhibiting a remarkably elongated life. The thermoplastic elastomer (TPE) used in the thermoplastic elastomer alloy is not limited to a urethanic one as described before.

In the present invention, the weight proportion [(B1)/(A11)] of the (B1) to (A11) is usually in the range of 0.1/99.9 to 60/40. The lower limit of the proportion (ratio) is preferably 1/99, more preferably 3/97, and especially preferably 7.5/92.5; and the upper limit thereof is preferably 55/45, more preferably 50/50, still more preferably 30/70, and especially preferably 25/75 (particularly 22/78). More specifically, the weight proportion [(B1)/(A11)] of the (B1) to (A11) is preferably 0.1/99.9 to 30/70, more preferably 1/99 to 25/75, and still more preferably 3/97 to 22/78 (particularly 7.5/92.5 to 22/78). If the proportion is too low, the improving effect of the durability of the abrasion resistance and bending fatigue resistance becomes small. By contrast, if the proportion is too high, properties (mechanical strength and the like) intrinsic to the thermoplastic resin are liable to decrease.

As described above, in the thermoplastic elastomer alloy comprising the polyurethane-based thermoplastic elastomer (A11) and the modified ethylene-propylene-diene copolymerized rubber (B1) and obtained by dispersing the modified ethylene-propylene-diene copolymerized rubber (B1) into the polyurethane-based thermoplastic elastomer (A11), a synergistic effect of the bending fatigue resistance by blending is especially remarkable.

Observation by a scanning electron microscope (SEM) of a molded article cross-section of the thermoplastic elastomer alloy according to the present invention reveals that the modified ethylene-propylene-diene copolymerized rubber (B1) is highly micro-dispersed in a matrix composed of the thermoplastic polyurethane (A11) (see FIGS. 2 and 4). For example, according to a SEM photograph at a magnification of 2,000 times, in a thermoplastic elastomer alloy composed of a modified EPDM and an etheric TPU, no particulate shape cannot be observed though unevenness is slightly seen; and in a thermoplastic elastomer alloy composed of a modified EPDM and an esteric TPU, almost no unevenness is observed. By contrast, in the case of using a non-modified EPDM in place of the modified EPDM, the particle of EPDM can be clearly observed; particularly in a thermoplastic elastomer alloy composed of an EPDM and an esteric TPU, it is clearly observed that spherical particles of the EPDM are dispersed in a matrix of the esteric TPU. The average particle diameter of the particle observed at this time is a value exceeding 3 μm. That the dispersibility is remarkably improved in a thermoplastic elastomer alloy composed of a modified EPDM and a TPU (especially, an esteric TPU) is presumably because the polarity of modified sites in the modified EPDM has an affinity for polar sites of the TPU.

Further observation of a molded article cross-section of the thermoplastic elastomer alloy according to the present invention using an atomic force microscope (AFM) reveals particles, which are not observed by SEM, and which are highly micro-dispersed, of the modified EPDM in a matrix (thermoplastic polyurethane) [see FIG. 12 (Example 4) and FIG. 13 (Example 7)]. According to these AFM photographs, it is found that in either of the thermoplastic elastomer alloy composed of the modified EPDM and the etheric TPU, and the thermoplastic elastomer alloy composed of the modified EPDM and the esteric TPU, the particles are dispersed in an average dispersed particle diameter of not more than 1 μm. If these results and the above-mentioned results of SEM photographs are collectively considered, an effect of the affinity of modified sites for the matrix is obvious.

The modified ethylene-propylene-diene copolymerized rubber (B1) in the thermoplastic elastomer alloy according to the present invention has an average dispersed particle aspect ratio of, for example, 1 to 3.5, preferably 1 to 3, and more preferably 1 to 2. The modified ethylene-propylene-diene copolymerized rubber (B1) in the thermoplastic elastomer alloy according to the present invention has an average dispersed particle diameter of, for example, not more than 3 μm, and preferably not more than 1 μm. The average dispersed particle aspect ratio nearer 1, that is, the particle nearer a true sphere, is better. The smaller average dispersed particle diameter is better. The simultaneous realization of both can be said to be better.

In the thermoplastic elastomer alloy according to the present invention, in addition to the above (A11) and (B1), as required, additives can be blended. Examples of the additives include antioxidants, ultraviolet absorbers, plasticizers, stabilizers, mold lubricants, surfactants, antistatic agents, electroconductive materials, colorants (pigments, dyes), flame retardants, foaming agents, slip agents, lubricants, bulking agents, crosslinking agents, solvents, developing solutions, extenders, waxes, oils, greases, processing aids, processing agents, reinforcing materials, fillers, antiblocking agents and antiaging agents.

In the thermoplastic elastomer alloy according to the present invention, the total content of a thermoplastic polyurethane (A11) and a modified ethylene-propylene-diene copolymerized rubber (B1) is, for example, not less than 85 wt %, preferably not less than 90 wt %, and still more preferably not less than 95 wt %.

The hardness of the thermoplastic elastomer alloy according to the present invention is, but not limited to, preferably not less than 60 (for example, 60 to 95), more preferably not less than 78 (for example, 78 to 95), still more preferably not less than 89 (for example, 89 to 95), and especially preferably not less than 91 (for example, 91 to 95), in hardness of JIS K6253 (durometer type A). From the viewpoint of having a reasonable flexibility and raising the bending fatigue resistance, the hardness of the thermoplastic elastomer alloy is, for example, in the range of 60 to 93, and especially preferably in the range of 77 to 91 (particularly, 77 to 88). The hardness of the thermoplastic elastomer alloy can be regulated by the hardness of the thermoplastic polyurethane (A11), the weight proportion of the thermoplastic polyurethane (A11) to the modified ethylene-propylene-diene copolymerized rubber (B1), the kinds and amounts of additives and the like.

The breaking strength (JIS K7311) of the thermoplastic elastomer alloy according to the present invention depends on a thermoplastic elastomer to become a continuous phase (sea component), but is, for example, 25 to 100 MPa, preferably 30 to 80 MPa, and more preferably 35 to 75 MPa; and the breaking elongation (JIS K7311) thereof is, for example, 300 to 1,000%, preferably 350 to 800%, and more preferably 400 to 700%.

The thermoplastic elastomer alloy according to the present invention can be produced by mixing the thermoplastic polyurethane (A11), the modified ethylene-propylene-diene copolymerized rubber (B1), and the additives used according to needs by the same method as the case of preparing usual polymer alloys or polymer blends. For example, the thermoplastic elastomer alloy can be produced by premixing the thermoplastic polyurethane (A11), the modified ethylene-propylene-diene copolymerized rubber (B1), and the additives used according to needs in predetermined proportions, and thereafter, kneading the mixture under heating, under pressure, in the presence of a solvent or the like by using a single-screw extruder, a twin-screw extruder, a mixing roll, a Banbury mixer, a batch-type kneader, a reactor, a reactive molding machine, an injection molding machine or the like. In the case of carrying out heating and kneading using an extruder, the alloy is extruded in a strand form, and may be cut into a suitable length to thereby make a granule such as a pellet. Besides the above method, the thermoplastic elastomer alloy according to the present invention can be produced also by charging the modified ethylene-propylene-diene copolymerized rubber (B1) and/or the additives during the production of the thermoplastic polyurethane (A).

The thermoplastic elastomer alloy according to the present invention can be subjected to melt molding or thermal processing, and can provide various types of molded articles by an optional method such as extrusion, injection molding, blow molding, calendar molding, press molding or casting.

A production method of molded articles of the thermoplastic elastomer alloy according to the present invention is not especially limited; molding may be carried out after the thermoplastic elastomer alloy is fabricated in advance, or the thermoplastic elastomer alloy according to the present invention can also be produced simultaneously when molding is carried out (for example, a side feed system and a dry blend system). The thermoplastic elastomer composition according to the present invention suffices if holding thermoplasticity in the fabrication time of the composition, and after the fabrication, may or may not have the thermoplasticity. There are cases where a final product is an elastomer composition having no thermoplasticity, for example, by addition of a crosslinking agent, as in the case of the thermoplastic resin composition. The explanation of the blending, the composition, the mechanism and the like is the same as that of the cases of the resin (A) and the modified ethylene copolymer (B).

[Molded Article]

Molded articles obtained from the thermoplastic resin composition according to the present invention and the thermoplastic elastomer alloy according to the present invention are excellent not only in the abrasion resistance but remarkably excellent in the bending fatigue resistance, and hardly cause abrasion, damage, cracks, breaks and the like even if being used continuously or intermittently in the state of being impressed with a large load, thus providing remarkably excellent durability and an elongated life. Therefore, the molded articles are especially useful as belts such as flat belts and V belts, tubes and hoses as well, adsorption pads, vibration-proof dampers, vibration-proof joints, shock absorbers, casters, packings, soles (shoe sole), switches, valves, filters, rolls, rollers (paper-discharge rollers, paper-feed rollers), clips, films, sheets, tires, casters, mats, gloves, adhesive bandages, robes, surface leathers, bags, instrument panels, snow chains, skiing boots, spring covers, pumps, and physical functional materials (artificial hearts and the like). Among these as the molded articles according to the present invention, preferable are belts such as flat belts and V belts, tubes, hoses, adsorption pads, vibration-proof dampers, vibration-proof joints, shock absorbers, casters, rollers (paper-discharge rollers, paper-feed rollers and the like), packings, and the like, in which these durability is remarkably improved because the bending fatigue resistance is very high.

[Belt]

Conveyance belts and transmission belts require bending fatigue resistance, abrasion resistance, heat resistance, durability and the like as a flat belt, V belt or the like. Belts are usually imparted with a tensile force and used in an elongated state. Belts are used in combination with resin-made or metal-made pulleys rotating at a high speed, and are contacted with pulleys, cause to be wound round pulleys and to fit thereon, and are exposed to collision with and rubbing on conveyed materials, and the like. The thermoplastic resin composition according to the present invention, since being excellent particularly in the bending fatigue resistance, can effectively be used as belts used in layouts in which the belts undergo severe bending fatigue, such as layouts in which a plurality of pulleys are combined and layouts having small-diameter pulleys. A too soft belt causes creeping deformation and the like, and reduces the life; and a too hard belt gives a large abrasion amount and the like, and also reduces the life. Having reasonable flexibility, abrasion resistance and bending fatigue resistance gives a highest performance to belts. Belts are produced in a long shape by laminating a resin or an elastomer with a fiber, a woven fabric or the like by a thermoplastic molding machine of extrusion or the like. The belts are used as they are in some cases, but usually, are subjected to endless processing and used in the state of having a continuous belt back surface.

[Tube]

Tubes are resin or elastomer products in a single tube form, and usually have joints on both ends. Since tubes have flexibility, the tubes have a high degree of freedom of piping and have a feature of being capable of deforming to movements of fixing parts, and other features. Tube materials require bending fatigue resistance, abrasion resistance, flexibility, air permeation resistance, flame retardancy, sealability at engagement with joints, and the like. Contacting and rubbing often occur to deformations and movements; and in the case of using resin materials and elastomer materials of the thermoplastic resin composition according to the present invention excellent in the abrasion resistance and the bending fatigue resistance, the abrasion amount and occurrence of cracks due to bending are suppressed, thus contributing to elongation of the life of products. The flexibility of tubes serves as a sealing effect between the tubes and joints; and that tubes are not too flexible suppresses deformation at caulking parts for a long time. Tubes are produced by extrusion or the like.

[Hose]

Hoses are used in applications of liquid transport, and require properties including oil resistance, chemical resistance, fatigue resistance, impact resistance, abrasion resistance, pressure resistance and local bending. Although using methods of hoses overlap with those of the tubes, since the hoses have a laminate structure combined with a reinforcing layer, the pressure of an internal fluid often becomes high. In the case of using resin materials of the thermoplastic resin composition according to the present invention excellent in the bending fatigue resistance, the hoses are effective in applications requiring the bending fatigue resistance, the repeated bending and the like. Hoses are produced by using as a reinforcing layer a layer in which fibers are woven, laminating the layer with a resin or an elastomer, and integrating the laminate by extrusion or the like.

[Adsorption Pad]

Adsorption pads are contacting jigs used for fixing, conveying and moving materials to be adsorbed. For example, materials to be adsorbed are lifted and moved by depressurizing an adsorption pad interior by vacuum adsorption or the like. Adsorption pads require the adsorbability of a part thereof contacting with a material to be adsorbed, the flexibility for not causing excessive deformation of the material to be adsorbed and the airtightness for efficiently adsorbing the material to be adsorbed, and the durability for repeated usage thereof. The thermoplastic resin composition according to the present invention excellent in the bending fatigue resistance can achieve improvements in the flexibility and the durability. The products are produced by injection molding, blow molding or the like.

[Vibration-Proof Damper]

In apparatuses generating vibration such as precision devices, acoustic devices, machine tools and automobiles, apparatuses disliking vibration from others, and the like, vibration-proof dampers absorb the vibration so as to stop outgo of the vibration from the apparatuses or to make the vibration to be hardly transmitted to the apparatuses. In such applications, the vibration-proof dampers, though being always exposed to vibration, require a high damping property to convert the kinetic energy, a vibration controllability to alter the resonance of a vibration frequency, the durability to repeated motions thereof, a high strength, and the like. The thermoplastic resin composition according to the present invention is adaptable to such requirements. Since the vibration-proof dampers are often used at fulcrums to support loads and thereby always subjected to a weight, the vibration-proof dampers are liable to cause compression set and tension set. In order to solve this, the vibration-proof dampers are made to have a crosslinked structure, and a laminate structure with a metal plate in some cases. The vibration-proof dampers can be used also as adhesive sheets used as springs. The vibration-proof dampers are produced by molding methods such as injection molding, compression molding, blow molding and press molding.

[Vibration-Proof Joint]

Vibration-proof joints are used for power transmission apparatuses and the like which suppress the transmission of vibration from vibration sources. Interposing a vibration-proof joint resultantly damps vibration generated at tubes, hoses, piping and the like, and apparatus vibration. Such applications require a low compression set, a high damping property, the durability, a high strength, and the like. The thermoplastic resin composition according to the present invention is adaptable to these required performances. The vibration-proof joints are produced by molding methods such as extrusion, injection molding, compression molding and blow molding.

[Shock Absorber]

Shock absorbers are apparatuses to damp vibration of mechanical structures and vibration generated in buildings. The shock absorber is a leading concept of the vibration-proof damper and the vibration-proof joint. On requirements using elastomer components, the shock absorbers have effects of converting a received vibration energy to vibration having a different period, and converting it to heat. Since the shock absorbers are subjected to continuous bending fatigue in the course of deforming motions at this time, having the bending fatigue resistance thereto leads to provide products excellent in durability.

[Caster]

Casters refer to rollers and wheels installed on grounding surfaces of mechanical apparatuses, conveyance vehicles, wagons and the like. The casters require a high mechanical strength in order to withstand the apparatus weights, and properties such as gripping resistance, durability, impact resistance and heat resistance. The gripping resistance sometimes requires flexibility in order to raise the friction resistance with floor surfaces and ground surfaces, and therefore repeats a small deformation and a deformation recovery partially centered on the grounding point of the casters in some cases. The casters require the bending fatigue resistance in order to withstand this. The thermoplastic resin composition according to the present invention, since being excellent in the abrasion resistance and the bending fatigue resistance, satisfy the performance required for the casters. The casters are produced by injection molding, compression molding, blow molding, press molding or the like.

[Roller]

Rollers such as paper-feed rollers and paper-discharge rollers require the abrasion resistance, the friction coefficient stability, a small compression set and the like. The thermoplastic resin composition according to the present invention being excellent in the bending fatigue resistance and the abrasion resistance is effective to improve the abrasion resistance and the bending fatigue resistance, and can provide the rollers excellent in the durability. This property is suitable for applications other than paper transport, for example, rollers imparted with a gripping power. The roller products are produced by extrusion, injection molding, compression molding, blow molding, lamination or the like.

[Packing]

Packings are used for the purposes of the airtightness of moving portions and movable portions of devices, shafts, members and the like, sealing and encapsulation of chemical substances such as lubricants and greases, liquids and solids, and buffering and smoothening their motions; in the case where devices and the like are subjected to rotation motions and reciprocating motions, and are repeatedly attached and detached, packings are exposed to the motions, and the use of the thermoplastic resin composition according to the present invention excellent in the bending fatigue resistance can secure packing properties over a long period. The packing products are produced by injection molding, extrusion, press molding or the like.

EXAMPLES

Hereinafter, the present invention will be described more specifically by way of Examples and Comparative Examples. The present invention is not any more limited thereto. The average dispersed particle aspect ratio and the average dispersed particle diameter of dispersed particles in a thermoplastic resin composition (thermoplastic elastomer alloy or the like) were measured by a scanning electron microscope (SEM), a transmission electron microscope (TEM) and an atomic force microscope (AFM).

Materials used in Examples and the like are shown below.

<Thermoplastic Resin (A)>
(1) TPU-1: an adipate-based TPU (thermoplastic polyurethane) of 90 in hardness
(2) TPU-2: a caprolactone-based TPU (thermoplastic polyurethane) of 90 in hardness
(3) TPU-3: a PTMG-based TPU (thermoplastic polyurethane) of 92 in hardness
(4) TPU-4: an adipate-based TPU (thermoplastic polyurethane) of 92 in hardness
(5) TPU-5: an adipate-based TPU (thermoplastic polyurethane) of 80 in hardness
(6) TPEE: trade name "Hytrel 4777" (a thermoplastic polyester elastomer, made by Du Pont-Toray Co., Ltd.)
(7) TPAE: trade name "UBESTA XPA 9040x1" (a thermoplastic polyamide elastomer, made by Ube Industries, Ltd.)
(8) POM: trade name "Duracon M90-44" (a polyacetal resin, made by Polyplastics Co., Ltd.)
(9) PEN: trade name "Teonex TN8065S" (a polyethylene naphthalate resin, made by Teijin Chemicals Ltd.)

<Modified Ethylene Copolymer (B)>
(1) MAH-EPDM: trade name "Fusabond N416" (a maleic anhydride-modified ethylene-propylene-diene copolymerized rubber, made by Du Pont K.K.)
(2) X-EA: trade name "Baymac" (an acid-modified ethylene acryl elastomer, made by Du Pont K.K.)
(3) MAH-EPM: trade name "Tafmer MP0610" (a maleic anhydride-modified ethylene-propylene copolymerized rubber, made by Mitsui Chemicals Inc.)

<Ethylene-Propylene-Diene Copolymerized Rubber>
EPDM: trade name "EP21" (an ethylene-propylene-diene copolymerized rubber, made by JSR Corp.)

Example 1

100 parts by weight of TPU-1 and 10 parts by weight of MAH-EPDM were kneaded using a twin-screw extruder (made by Technovel Corp., trade name "KZW20TW-30"). The extruder was set at a barrel temperature of 200° C. (here, a feeder portion temperature of 160° C.) and a screw rotation frequency of 300 rpm; and the resins were melt kneaded, and passed through a pelletizer to thereby fabricate a pellet. The obtained pellet was injection molded using an injection molding machine (made by Nissei Plastic Industrial Co., Ltd., trade name "NEX110-18E") to thereby fabricate test pieces [100 mm×100 mm×2 mm thick (for abrasion test), 120 mm×10 mm×4 mm thick (for Demattia flex test)].

Comparative Example 1

A pellet and test pieces were fabricated by the same operation as in Example 1, except for using 100 parts by weight of TPU-1 alone as a raw material resin.

Example 2

A pellet and test pieces were fabricated by the same operation as in Example 1, except for using 100 parts by weight of TPU-2 and 10 parts by weight of MAH-EPDM as raw material resins.

Comparative Example 2

A pellet and test pieces were fabricated by the same operation as in Example 1, except for using 100 parts by weight of TPU-2 alone as a raw material resin.

Example 3

A pellet and test pieces were fabricated by the same operation as in Example 1, except for using 100 parts by weight of TPU-3 and 5 parts by weight of MAH-EPDM as raw material resins. An MAH-EPDM particle in an obtained thermoplastic elastomer alloy had an average dispersed particle aspect ratio of 1.23 and an average dispersed particle diameter of 0.35 μm.

Example 4

A pellet and test pieces were fabricated by the same operation as in Example 1, except for using 100 parts by weight of TPU-3 and 10 parts by weight of MAH-EPDM as raw material resins. An MAH-EPDM particle in an obtained thermoplastic elastomer alloy had an average dispersed particle aspect ratio of 1.11 and an average dispersed particle diameter of 0.42 μm.

Example 5

A pellet and test pieces were fabricated by the same operation as in Example 1, except for using 100 parts by weight of TPU-3 and 20 parts by weight of MAH-EPDM as raw material resins. An MAH-EPDM particle in an obtained thermoplastic elastomer alloy had an average dispersed particle aspect ratio of 1.08 and an average dispersed particle diameter of 0.52 μm.

Comparative Example 3

A pellet and test pieces were fabricated by the same operation as in Example 1, except for using 100 parts by weight of TPU-3 alone as a raw material resin.

Comparative Example 4

A pellet and test pieces were fabricated by the same operation as in Example 1, except for using 100 parts by weight of TPU-3 and 10 parts by weight of EPDM as raw material resins. An EPDM particle in an obtained thermoplastic elastomer alloy had an average dispersed particle aspect ratio of 1.1 and an average dispersed particle diameter of 5.8 μm.

Example 6

A pellet and test pieces were fabricated by the same operation as in Example 1, except for using 100 parts by weight of TPU-4 and 5 parts by weight of MAH-EPDM as raw material resins. An MAH-EPDM particle in an obtained thermoplastic elastomer alloy had an average dispersed particle aspect ratio of 1 and an average dispersed particle diameter of 0.62 μm.

Example 7

A pellet and test pieces were fabricated by the same operation as in Example 1, except for using 100 parts by weight of TPU-4 and 10 parts by weight of MAH-EPDM as raw material resins. An MAH-EPDM particle in an obtained thermoplastic elastomer alloy had an average dispersed particle aspect ratio of 1.08 and an average dispersed particle diameter of 0.52 μm.

Example 8

A pellet and test pieces were fabricated by the same operation as in Example 1, except for using 100 parts by weight of TPU-4 and 20 parts by weight of MAH-EPDM as raw material resins. An MAH-EPDM particle in an obtained thermoplastic elastomer alloy had an average dispersed particle aspect ratio of 1.85 and an average dispersed particle diameter of 0.77 μm.

Example 9

A pellet and test pieces were fabricated by the same operation as in Example 1, except for using 100 parts by weight of TPU-5 and 10 parts by weight of MAH-EPDM as raw material resins.

Comparative Example 5

A pellet and test pieces were fabricated by the same operation as in Example 1, except for using 100 parts by weight of TPU-4 alone as a raw material resin.

Comparative Example 6

A pellet and test pieces were fabricated by the same operation as in Example 1, except for using 100 parts by weight of TPU-4 and 10 parts by weight of EPDM as raw material resins. An EPDM particle in an obtained thermoplastic elastomer alloy had an average dispersed particle aspect ratio of 1.1 and an average dispersed particle diameter of 3.2 μm.

Evaluation Tests

<Taber Abrasion Test>

An abrasion loss (mg) after the rotation number of 1,000 times using a Taber abrasion tester using an abrasion wheel H-22 at a load of 9.8 N was measured for the test piece of 100 mm×100 mm×2 mm thick, according to JIS K7311. The results are shown in Table 1.

<Bending Fatigue Test (Bending Crack-Growing Test)>

A Demattia flex test was carried out according to JIS K6260. A notch of 0.5 mm in depth was cut across the nearly entire length in the width direction of a middle portion of the long side (a position of 60 mm from the end in the longitudinal direction) on the strip test piece of 120 mm×10 mm×4 mm thick, and the notched test piece was provided for the test. The test was carried out under the condition of a maximum distance between chucks of 80 mm, a motion distance between the chucks of 70 mm and a bending speed of 97 times/min, and a bending number of times (bending fatigue number of times) until the depth of a crack from the notch of the test piece reached 3.5 mm was measured. The results are shown in Table 1.

<Hardness>

A hardness was measured according to JIS K6253 (durometer type A). The pellet was injection molded by an injection molding machine (made by Nissei Plastic Industrial Co., Ltd., trade name "NEX110-18E") to thereby fabricate test pieces of 100 mm×100 mm×2 mm thick; three sheets thereof were stacked to thereby prepare a test piece of 6 mm in thickness; and a measurement of a hardness was carried out using the stacked test piece. The results are shown in Table 1.

<Tensile Test>

A tensile test was carried out according to JIS K7311, and a breaking strength (MPa) and a breaking elongation (%) were determined. The results are shown in Table 1. Test pieces for the tensile test were fabricated by stamping out the test pieces for the abrasion test.

<Disperse State Checking Test (SEM Observation and AFM Observation)>

Cross-sections of the pellets obtained by a twin-screw extruder were cut out by a freezing microtome, and observed using a scanning electron microscope (made by Hitachi High-Technologies Corp., trade name "S-4300") at a magnification of 2,000 times. A SEM photograph of a cross-section of the pellet obtained in Comparative Example 4 is shown in FIG. 1; a SEM photograph of a cross-section of the pellet obtained in Example 4, in FIG. 2; a SEM photograph of a cross-section of the pellet obtained in Comparative Example 6, in FIG. 3; and a SEM photograph of a cross-section of the pellet obtained in Example 7, in FIG. 4. Cross-sections of the pellets were further observed using an atomic force microscope (AFM). An AFM photograph of a cross-section of the pellet obtained in Example 4 is shown in FIG. 12; and an AFM photograph of a cross-section of the pellet obtained in Example 7 is shown in FIG. 13.

From the evaluation results shown in Table 1, it is clear that the molded articles formed using a thermoplastic elastomer alloy according to the present invention are remarkably better not only in the Taber abrasion loss but also in the bending fatigue resistance than the molded articles formed from a thermoplastic polyurethane alone, and the molded articles formed from a thermoplastic elastomer alloy composed of a thermoplastic polyurethane and a non-modified ethylene-propylene-diene copolymerized rubber. The case where a modified ethylene-propylene-diene copolymerized rubber is added can improve the abrasion resistance and the bending fatigue resistance without spoiling the material property of a thermoplastic polyurethane. Although even the case where a non-modified ethylene-propylene-diene copolymerized rubber is added exhibits an improving affect in some degree of the bending fatigue resistance in some cases, the cases of largely improving the abrasion resistance and the bending fatigue resistance are cases of a thermoplastic polyurethane alloyed with a modified ethylene-propylene-diene copolymerized rubber. From the results of the disperse state checking test (SEM observation), it is clear that the disperse states are better in order of an esteric TPU-EPDM<an etheric TPU-EPDM<an etheric TPU-maleic anhydride-modified EPDM<an esteric TPU-maleic anhydride-modified EPDM. It is further clear from the AFM photograph that any of the thermoplastic elastomer alloys composed of a modified EPDM and an etheric TPU and the thermoplastic elastomer alloys composed of a modified EPDM and an esteric TPU are dispersed in an average dispersed particle diameter of not more than 1 μm.

The reason why the Taber abrasion and the bending number of times are remarkably improved is conceivably that a retardation effect of crack extension of the microdispersion of the modified ethylene copolymer component having an energy absorbing effect changes states from the severe abrasion progress called adhesion wearing of TPU to the mild abrasion progress. This is because the thermoplastic elastomer alloy is obtained as a combination in which a modified ethylene copolymer component (elastomer component) is near a spherical shape like a micro phase separation structure, and microdispersed in a TPU. In a simply blended state in no consideration of compatibility and shearing viscosity, the shape of the island (dispersoid) is usually irregular and in a mechanically crushed-like shape in many cases, and then, the adhesive force between the island layer (disperse phase) and the sea layer (continuous phase) is weak; exfoliation is liable to be caused at the interface when a stress is impressed on molded articles; and the resistance to crack generation also from the island shape becomes poor. These cause inferior durability in some cases. However, the thermoplastic resin composition and the thermoplastic elastomer alloy according to the present invention, by increasing the adhesive surface of the island layer (disperse phase) and the sea layer (continuous phase) and raising the adhesive force, can provide a disperse form in which the island layer (disperse phase) is micro-dispersed and in a nearly true spherical shape, and can be remarkably improved in the durability under the motion condition impressed with repeated loads, stresses and deformations. Nobody has developed such properties and confirmed the effects, and the properties and effects have been found by exhaustive devices by the present inventors.

TABLE 1

|  | Example 1 | Comp. Ex. 1 | Example 2 | Comp. Ex. 2 | Example 3 | Example 4 | Example 5 | Comp. Ex. 3 |
|---|---|---|---|---|---|---|---|---|
| TPU-1 | 100 | 100 | | | | | | |
| TPU-2 | | | 100 | 100 | | | | |
| TPU-3 | | | | | 100 | 100 | 100 | 100 |
| TPU-4 | | | | | | | | |
| TPU-5 | | | | | | | | |
| MAH-EPDM (Phr) | 10 | | 10 | | 5 | 10 | 20 | |
| MAH-EPM (Phr) | | | | | | | | |
| EPDM (phr) | | | | | | | | |
| Taber Abrasion Amount (mg) | 9.3 | 12.9 | 6.3 | 11.5 | 8.1 | 8.5 | 8.5 | 12.5 |
| Bending Number Of Times (times) | 400,000 | 5,000 | 18,000 | 3,000 | 8,000 | 250,000 | 170,000 | 3,000 |
| JIS A Hardness | 90 | 92 | 87 | 88 | 92 | 92 | 90 | 92 |
| Breaking Strength (MPa) | — | — | — | — | — | — | — | — |
| Breaking Elongation (%) | — | — | — | — | — | — | — | — |
| Aspect Ratio | — | — | — | — | 1.23 | 1.11 | 1.08 | — |
| Average Dispersed Particle Diameter | — | — | — | — | 0.35 | 0.42 | 0.52 | — |

|  | Comp. Ex. 4 | Example 6 | Example 7 | Example 8 | Comp. Ex. 5 | Comp. Ex. 6 | Example 9 |
|---|---|---|---|---|---|---|---|
| TPU-1 | | | | | | | |
| TPU-2 | | | | | | | |
| TPU-3 | 100 | | | | | | |
| TPU-4 | | 100 | 100 | 100 | 100 | 100 | |
| TPU-5 | | | | | | | 100 |

TABLE 1-continued

| | | | | | | | |
|---|---|---|---|---|---|---|---|
| MAH-EPDM (Phr) | | 5 | 10 | 20 | | 10 | |
| MAH-EPM (Phr) | | | | | | | |
| EPDM (phr) | 10 | | | | | 10 | |
| Taber Abrasion Amount (mg) | 12.4 | 11 | 6.8 | 10.8 | 16.4 | 16.6 | 7.4 |
| Bending Number Of Times (times) | 40,000 | 15,000 | 330,000 | 270,000 | 5,000 | 17,000 | 1,800,000 |
| JIS A Hardness | 91 | 93 | 93 | 91 | 95 | 91 | 79 |
| Breaking Strength (MPa) | — | 57 | 47 | 38 | 52 | — | — |
| Breaking Elongation (%) | — | 560 | 510 | 490 | 520 | — | — |
| Aspect Ratio | 1.1 | 1 | 1.08 | 1.85 | — | 1.1 | — |
| Average Dispersed Particle Diameter | 5.8 | 0.62 | 0.52 | 0.77 | — | 3.2 | — |

Example 10

A pellet and test pieces were fabricated by the same operation as in Example 1, except for using 100 parts by weight of TPU-4 and 150 parts by weight of MAH-EPDM as raw material resins.

Comparative Example A

A pellet and test pieces were fabricated by the same operation as in Example 1, except for using 100 parts by weight of MAH-EPDM alone as a raw material resin.

Example 11 (An Example Using a Polyester-Based Thermoplastic Elastomer)

A pellet and test pieces were fabricated by the same operation as in Example 1, except for using 100 parts by weight of TPEE and 10 parts by weight of MAH-EPM as raw material resins.

Comparative Example 7

A pellet and test pieces were fabricated by the same operation as in Example 1, except for using 100 parts by weight of TPEE alone as a raw material resin.

Example 12 (An Example Using a Polyamide-Based Thermoplastic Elastomer)

A pellet and test pieces were fabricated by the same operation as in Example 1, except for using 100 parts by weight of TPAE and 10 parts by weight of MAH-EPDM as raw material resins.

Comparative Example 8

A pellet and test pieces were fabricated by the same operation as in Example 1, except for using 100 parts by weight of TPAE alone as a raw material resin.

Example 13 (An Example Using a Polyacetal Resin)

A pellet and test pieces were fabricated by the same operation as in Example 1, except for using 100 parts by weight of POM and 10 parts by weight of MAH-EPDM as raw material resins.

Comparative Example 9

A pellet and test pieces were fabricated by the same operation as in Example 1, except for using 100 parts by weight of POM alone as a raw material resin.

The above-mentioned evaluation tests were carried out using the test pieces obtained in Examples 10 to 13, Comparative Example A and Comparative Examples 7 to 9. In Example 11 and Comparative Example 7, the hardnesses were values measured according to JIS K6253 (durometer type D). The results are shown in Table 2.

TABLE 2

| | Example 10 | Comparative Example A | Example 11 | Comparative Example 7 | Example 12 | Comparative Example 8 | Example 13 | Comparative Example 9 |
|---|---|---|---|---|---|---|---|---|
| TPU-1 | | | | | | | | |
| TPU-2 | | | | | | | | |
| TPU-3 | | | | | | | | |
| TPU-4 | 100 | | | | | | | |
| TPU-5 | | | | | | | | |

TABLE 2-continued

|  | Example 10 | Comparative Example A | Example 11 | Comparative Example 7 | Example 12 | Comparative Example 8 | Example 13 | Comparative Example 9 |
|---|---|---|---|---|---|---|---|---|
| TPEE |  |  | 100 | 100 |  |  |  |  |
| TPAE |  |  |  |  | 100 | 100 |  |  |
| POM |  |  |  |  |  |  | 100 | 100 |
| MAH-EPDM (phr) | 150 | 100 |  |  | 10 |  | 10 |  |
| MAH-EPM (phr) |  |  | 10 |  |  |  |  |  |
| EPDM (phr) |  |  |  |  |  |  |  |  |
| Taber Abrasion Amount (mg) | — | 128 | 35 | 67 | 30.5 | 39.5 | 48 | 62 |
| Bending Number Of Times (times) | 110,000 | 52,000 | — | — | — | — | — | — |
| JIS A Hardness | — | — | — | — | 94 | 93 | 95 | 95 |
| JIS D Hardness | — | — | 47 | 47 | — | — | — | — |
| Breaking Strength (MPa) | — | — | — | — | — | — | — | — |
| Breaking Elongation (%) | — | — | — | — | — | — | — | — |
| Aspect Ratio | — | — | — | — | — | — | — | — |
| Average Dispersed Particle Diameter | — | — | — | — | — | — | — | — |

By using the each evaluation result (bending number of times) of Comparative Example 5 (MAH-EPDM: 0 wt %), Example 7 (MAH-EPDM: 9 wt %), Example 8 (MAH-EPDM: 17 wt %), Example 10 (MAH-EPDM: 60 wt %), and Comparative Example A (MAH-EPDM: 100 wt %) obtained in the above, a relationship between the blend ratio (wt %) of a modified ethylene copolymer (MAH-EPDM) in a thermoplastic resin composition (a thermoplastic elastomer alloy) and the bending fatigue resistance is expressed as a graph (single logarithmic graph) (see FIG. 5). In FIG. 5, the abscissa is the blend ratio (wt %) of MAH-EPDM, and the ordinate is the bending number of times. (a) of FIG. 5 is a graph obtained by plotting data of Comparative Example 5 and Comparative Example A and connecting these two points by a straight line (broken line). (b) of FIG. 5 is a graph obtained by plotting data of Comparative Example 5, Example 7, Example 8, Example 10 and Comparative Example A and connecting the each point by a straight line (solid line). (c) of FIG. 5 is a graph obtained by superposing (a) and (b) of FIG. 5.

As shown in FIG. 5, the bending fatigue resistances of the molded articles of the resin compositions in which the modified ethylene copolymer (B) is dispersed into the thermoplastic resin (A) has more improved values than expected in each single material, and exhibits a synergistic effect.

Examples 14 to 20 and Comparative Examples 10 to 16 (Examples Using Other Modified Ethylene Copolymers)

100 parts by weight of the total of a polyethylene naphthalate resin (PEN) as a thermoplastic resin and X-EA as a modified ethylene copolymer (the ratio of both the components are shown in Table 3), variable amounts shown in Table 3 of a fatty acid metal salt (magnesium stearate), a phenol resin and a metal oxide (magnesium oxide) as curing agents, and one part by weight of an antiaging agent (2,2,4-trimethyl-1,2-dihydroquinoline polymer) were added to and kneaded in a Laboplasto Mill (made by Toyo Seki Seisaku-sho, Ltd., trade name "4C150"). First, the resins were sufficiently fused and kneaded, and thereafter the curing agents were added, and after the curing (crosslinking) reaction, the antiaging agent was added. The reaction was checked by changing behavior of the kneading torque value. The kneading temperature was set at 260° C., and the kneading was carried out for a total of 10 min. Thereafter, test pieces [100 mm×100 mm×2 mm thick (for abrasion test)] were fabricated by press molding. Respective evaluation test pieces such as tensile test pieces were stamped out from the abrasion test pieces. Bending fatigue test pieces were fabricated by injection molding. Comparative Example 10 was a PEN resin itself in which no additives except for an antiaging agent was added, and a sheet thereof was obtained by injection molding. Comparative Example 16 was prepared by kneading PEN resin and non-modified EPDM at a temperature near the melting point of the PEN by a Laboplasto Mill. Examples 19 and 20 were prepared by varying the blend proportion of PEN to X-EA and kneading by a twin-screw extruder in place of the Laboplasto Mill. The others were the same as Example 15. Properties of the obtained thermoplastic resin compositions and the average dispersed particle aspect ratios of the dispersed particles (X-EA particle and the like) were measured and evaluated by the above-mentioned methods. The results are shown in Table 3. The tensile elastic modulus, the modulus strength at 20% elongation, the tensile strength, the tensile elongation rate (tensile elongation) and the tension set were measured by a tensile test according to JIS K7311. The hardnesses (Shore A) in Table 3 are values measured according to JIS K6253 (durometer type A), and the hardnesses (Shore D) therein are values measured according to JIS K6253 (durometer type D).

The results (tensile elongation rates, tensile strengths) of the tensile tests of the resin compositions obtained in Examples 14 to 18 and Comparative Examples 11 to 15 are shown in FIG. 6. In the graph of FIG. 6, the abscissa is the tensile elongation rate (%), and the ordinate is the tensile strength (MPa). Symbol a in the graph is data of Comparative Example 11; b, Comparative Example 12; c, Comparative Example 13; d, Comparative Example 14; e, Comparative Example 15; f, Example 14; g, Example 15; h, Example 16; i, Example 17; and j, Example 18.

TABLE 3

| | | | Comp. Ex. 10 | Comp. Ex. 11 | Comp. Ex. 12 | Comp. Ex. 13 | Comp. Ex. 14 | Comp. Ex. 15 | Example 14 | Example 15 |
|---|---|---|---|---|---|---|---|---|---|---|
| Blend | PEN | | 100 | 45 | 45 | 45 | 45 | 45 | 45 | 45 |
| | X-EA | | — | 55 | 55 | 55 | 55 | 55 | 55 | 55 |
| | EPDM | | — | — | — | — | — | — | — | — |
| | Magnesium Stearate | | — | 0 | 0.2 | 0.4 | 0.7 | 0.8 | 1.5 | 2 |
| | Phenol Resin | | — | 0 | 0.1 | 0.2 | 0.35 | 0.4 | 0.75 | 1 |
| | Magnesium Oxide | | — | 0 | 0.1 | 0.3 | 0.35 | 0.4 | 0.75 | 1 |
| Dispersion | Dispersoid | μm | — | PEN | PEN | PEN | PEN, X-EA | PEN, X-EA | X-EA | X-EA |
| | Average Dispersed Particle Diameter | | — | <0.41 | <0.31 | <0.17 | — | — | 0.25 | 0.25 |
| | Aspect ratio | | — | 1.1 | 1.2 | 1.6 | 10< | 10< | 3.2 | 2.5 |
| Physical Properties | Tensile Elastic Modulus | MPa | 2200 | 2 | 5 | 30 | 126 | 216 | 237 | 267 |
| | Modulus Strength at 20% Elongation | MPa | — | 0.3 | 0.6 | 4.8 | 7.7 | 11.7 | 12.9 | 13.7 |
| | Tensile Strength | MPa | 74 | 0.4 | 2.3 | 6.3 | 18 | 21.2 | 23.6 | 26.8 |
| | Tensile Elongation Rate | % | <10 | 650 | 480 | 320 | 130 | 130 | 190 | 200 |
| | Hardness (Shore A) | | — | 70(A) | 73(A) | 87(A) | 94(A) | 97(A) | 72(A) | — |
| | Hardness (Shore D) | | 78(D) | — | — | 42(D) | 50(D) | 56(D) | 45(D) | 63(D) |
| | Tension set | % | 100 | 57.5 | 17.5 | 16.5 | 32 | 44.5 | 45 | 40.5 |
| | Taber Abrasion Test | mg | 51.9 | 88.2 | 62.2 | 41.5 | 45.6 | 44 | 40.3 | 40.6 |
| | Bending Fatigue Number Of Times | times | — | 250 | — | 64,000 | 29,000 | 45,000 | 103,000 | 252,000 |

| | | | Example 16 | Example 17 | Example 18 | Example 19 | Example 20 | Comp. Ex. 16 |
|---|---|---|---|---|---|---|---|---|
| Blend | PEN | | 45 | 45 | 45 | 60 | 40 | 50 |
| | X-EA | | 55 | 55 | 55 | 40 | 60 | — |
| | EPDM | | — | — | — | — | — | 50 |
| | Magnesium Stearate | | 3 | 4 | 9 | 2 | 2 | 0 |
| | Phenol Resin | | 1.5 | 2 | 4.5 | 1 | 1 | 0 |
| | Magnesium Oxide | | 1.5 | 2 | 4.5 | 1 | 1 | 0 |
| Dispersion | Dispersoid | μm | X-EA | X-EA | X-EA | X-EA | X-EA | EPDM |
| | Average Dispersed Particle Diameter | | 0.25 | 0.15 | 0.15 | 0.1 | 0.25 | 4.1 |
| | Aspect ratio | | 2.5 | 1.9 | 1.6 | 1.7 | 3.5 | 1.9 |
| Physical Properties | Tensile Elastic Modulus | MPa | 210 | 201 | 266 | 450 | 230 | 228 |
| | Modulus Strength at 20% Elongation | MPa | 13.6 | 13.1 | 16.7 | 20.5 | 11.5 | 11.1 |
| | Tensile Strength | MPa | 29.1 | 29.3 | 35.5 | 45.5 | 42.3 | 20 |
| | Tensile Elongation Rate | % | 220 | 230 | 230 | 340 | 350 | 210 |
| | Hardness (Shore A) | | — | — | — | — | — | — |
| | Hardness (Shore D) | | 63(D) | 63(D) | 66(D) | 69(D) | 66(D) | 57(D) |
| | Tension set | % | 40.5 | 41.5 | 43 | 47 | 40 | 69 |
| | Taber Abrasion Test | mg | 35.6 | 36.8 | 39.3 | 37.8 | 36.5 | 54.1 |
| | Bending Fatigue Number Of Times | times | 140,000 | 300,000 | 444,000 | 803,000 | 180,000 | 4,250 |

From the results of Table 3, in the case where PEN resin and X-EA are mixed, since the shearing viscosity of X-EA is low even if the temperature is a temperature not less than the melting point of PEN resin, X-EA makes a continuous phase, and PEN resin is dispersed in a nearly true spherical shape as a disperse phase (Comparative Example 11). A TEM photograph of the resin composition of Comparative Example 11 is shown in FIG. 7 [a photograph of a magnification of 10,000 times (in a size of 112 mm×161 mm)]. At this time, since the affinity of the ester component and an acid-modified component of X-EA for PEN resin is high and the compatibilization is promoted, the average particle diameter of the dispersed X-EA is much as small as not more than about 0.41 μm. However, in this state, although the adhesion of the composition is very high and the tensile elongation rate is high, since almost no tensile strength is exhibited, the composition cannot be used as resin molded articles. If a curing agent reactive with X-EA is then added to this system, a quick curing reaction is caused even during the kneading and the shearing viscosity of X-EA continuously rises. If the curing reaction of X-EA is promoted by increasing the amount of the curing agent to X-EA, respective shearing viscosities of PEN resin and X-EA during kneading resultantly approach and the shearing viscosities of both the components, though depending on their volume fractions, become comparable at a curing agent addition amount and both the components make a continuous phase (Comparative Examples 14 and 15). A TEM photograph of the resin composition of Comparative Example 14 is shown in FIG. 8 [a photograph of a magnification of 10,000 times (in a size of 112 mm×161 mm)]. At this time, the aspect ratio of the dispersed particle becomes maximum, but the tensile elongation becomes smallest (see FIG. 6). The resin composition cannot be used in applications requiring the durability because of the anisotropy.

If the curing agent amount to X-EA is further increased, the shearing viscosity of X-EA increases due to the curing reaction during kneading, and becomes relatively higher than that of PEN resin. If the curing reaction is completed under kneading at a temperature not less than the melting point of the resin, X-EA phase-transforms to the island phase (disperse phase), and PEN resin phase-transforms to the sea phase (continuous phase) (Example 14). A TEM photograph of the resin composition of Example 14 is shown in FIG. 9 [a photograph of a magnification of 10,000 times (in a size of 112 mm×161 mm)]. If the phase transformation is caused in the course of the kneading reaction, the dispersion in which each phase mutually penetrates and polymer phases thereby entangled very complicatedly and firmly is introduced. Through the process, X-EA is still made to be high in viscosity, and X-EA including PEN resin thereby becomes in the disperse state in a true spherical shape. In this case, since the sea phase (continuous phase) is PEN resin, the composition, even though having a high viscosity, holds thermoplasticity as a whole. Further since the sheet moldability by press improves, the tensile strength and the tensile elongation rate both increases (Examples 14 to 18, see FIG. 6). Since the dispersed particle diameter determined from the TEM image was in much as fine a disperse state as not more than 0.3 μm, the resin composition did not whiten at bending portions even if being bent, and exhibited excellent resistance to repeated fatigue. Example 19 provided a very fine dispersed particle diameter though the comparison could not be carried out unconditionally because the PEN component amount was increased and the kneading was carried out by a twin-screw extruder. A TEM photograph of the resin composition of Example 19 is shown in FIG. 10 [a photograph of a magnification of 10,000 times (in a size of 112 mm×161 mm)]. In the results in Table 3, the sea phase (continuous phase) of Comparative Examples 11 to 13 is a modified ethylene copolymer, and Comparative Examples 11 to 13 have insufficient mechanical properties unless being sufficiently crosslinked. Comparative Examples 11 and 12 cannot be handled as a thermoplastic resin composition excellent in durability. Comparative Examples 14 and 15 were in a disperse state in which both the polymer components made continuous phases, and had an aspect ratio of more than 10, and exhibited an inferior mechanical strength and a low bending fatigue. The resin compositions of Examples 14 to 20, even though holding thermoplasticity, had a disperse state excellent in the mechanical strength, the abrasion resistance and the durability (bending fatigue resistance).

Comparative Example 16 in Table 3 is an example in which PEN resin and EPDM are kneaded by a Laboplasto Mill. In this combination, since the shearing viscosity of EPDM is higher during kneading than that of PEN resin, the resin composition has a disperse state in which PEN resin makes the sea phase (continuous phase) and crushed EPDM makes the island phase (disperse phase) and is dispersed in the sea phase. A TEM photograph of the resin composition of Comparative Example 15 is shown in FIG. 11 [a photograph of a magnification of 10,000 times (in a size of 112 mm×161 mm)]. This is because EPDM has no functional group and no treatment so as to promote the compatibilization with the resin is carried out. This combination has an average dispersed particle diameter exceeding 4 μm, and an aspect ratio of as large as about 2. If this sheet is bent, the bent potion whitens. There was conceivably generated a large amount of micro-cracks, and the test number of times became small in the bending fatigue test. As described above, the disperse state of a resin composition had a large influence on the durability; and the result was acquired that a resin composition in which an ideal micro phase separation structure (designed inhomogeneous structure) was achieved exhibited higher durability than a resin (homogeneous structure) as it was blended with nothing.

The resin compositions shown in Table 3 exhibits the resistance in each test such as a Taber abrasion test, a bending fatigue test and a tension set test without depending on the impression time of a stress. Although these evaluation tests has different timings of stress impression and different degrees of bending deformation, the motion behavior in the evaluations is, though having different degrees thereof, a stress-impressed deformation, and a motion, deformation or work contained in the concept of the durability (bending fatigue resistance) used in the present invention. Although impressed stresses to which actual products are subjected and the way the actual products are subjected to loads are diverse, the resin composition according to the present invention can consequently be used as a durable material.

The disperse state of a resin composition is in relationships in which the volume fraction and the shearing viscosity of each component, the kind and amount of a curing agent, the time of the curing reaction, the temperature and time of kneading and the like are complicatedly mutually related. The dispersed particle diameter becomes small by increasing the shearing rate in kneading; and the relatively higher the shearing viscosity of the island phase (disperse phase) than that of the sea phase (continuous phase), a more tendency to have a spherical shape the island phase (disperse phase) has. Depending on the molding condition, the shape of the island phase (disperse phase) elongates (the aspect ratio becomes large) due to the flow of a resin composition, and the disperse state in the kneading state becomes different in some cases. Particularly in the case where the island phase (disperse phase) and the sea phase (continuous phase) are complicatedly mutually entangled, the shape of the island phase (disperse phase) is liable to receive the influence of flow of the resin composition. For example, in the case where a sheet once made is again melted and reprocessed, the disperse state of the melted portion may be different. In order to maintain a rational disperse state, after heat molding, the resin composition needs to be quickly cooled to thereby minimize the re-aggregation of the dispersed island phase (disperse phase). That is, it is important that the resin composition maintains the disperse state used in the present invention even though being subjected to a thermal history and a shearing history. From the above, that a material (resin composition) constituting products finally provided satisfies the dispersed particle diameter and the aspect ratio according to the present invention consequently provides the products excellent in the durability.

The resin composition according to the present invention may be used for the whole of a product, or may be used for a part of a product. Also the use of the resin composition according to the present invention only in sites to which a stress is concentratedly impressed securely improves the durability.

INDUSTRIAL APPLICABILITY

The thermoplastic resin composition according to the present invention is not only excellent in the abrasion resistance but also remarkably excellent in the durability, particularly in the bending fatigue resistance, and hardly causes abrasion, damage, cracks, breaks and the like even if being used for a long time in the state of being impressed with a large load or even if the time of being subjected to a load is short. Therefore, the resin composition is useful as a molding resin composition for molded articles such as belts, tubes, hoses, absorption pads, vibration-proof dampers, vibration-proof joints, shock absorbers, casters, rollers and packings.

The invention claimed is:

1. A thermoplastic resin composition is a thermoplastic elastomer alloy, wherein the thermoplastic elastomer alloy comprises a polyurethane-based thermoplastic elastomer (A11) and a modified ethylene-propylene-diene copolymerized rubber (B1), and is obtained by dispersing the modified ethylene-propylene-diene copolymerized rubber (B1) into the polyurethane-based thermoplastic elastomer (A11), wherein the polyurethane-based thermoplastic elastomer (A11) is at least one selected from the group consisting of adipate-based thermoplastic polyurethanes, caprolactone-based thermoplastic polyurethanes, and polytetramethylene ether glycol-based thermoplastic polyurethanes, and forms a continuous phase in the thermoplastic elastomer alloy, wherein the modified ethylene-propylene-diene copolymerized rubber (B1) is a maleic anhydride-modified ethylene-propylene-diene copolymerized rubber, and forms a disperse phase in the thermoplastic elastomer alloy, wherein a content rate of the modified ethylene-propylene-diene copolymerized rubber (B1) is 30 to 60 wt % based on the total content of the polyurethane-based thermoplastic elastomer (A11) and the modified ethylene-propylene-diene copolymerized rubber (B1).

2. The thermoplastic resin composition according to claim 1, wherein the modified ethylene-propylene-diene copolymerized rubber (B1) in the thermoplastic elastomer alloy has an average dispersed particle aspect ratio of 1 to 3.5 and an average dispersed particle diameter of not more than 3 μm.

3. The thermoplastic resin composition according to claim 1, wherein a content rate of the modified ethylene-propylene-diene copolymerized rubber (B1) is 50 to 60 wt % based on the total content of the polyurethane-based thermoplastic elastomer (A11) and the modified ethylene-propylene-diene copolymerized rubber (B1).

4. The thermoplastic resin composition according to claim 2, wherein a content rate of the modified ethylene-propylene-diene copolymerized rubber (B1) is 50 to 60 wt % based on the total content of the polyurethane-based thermoplastic elastomer (A11) and the modified ethylene-propylene-diene copolymerized rubber (B1).

5. The thermoplastic resin composition according to claim 1, wherein the modified ethylene-propylene-diene copolymerized rubber (B1) in the thermoplastic elastomer alloy has an average dispersed particle aspect ratio of 1.08 to 3.5 and an average dispersed particle diameter of not more than 3 μm.

* * * * *